(12) United States Patent
Yadin et al.

(10) Patent No.: US 11,747,619 B2
(45) Date of Patent: Sep. 5, 2023

(54) VIRTUAL REALITY AND AUGMENTED REALITY SYSTEMS WITH DYNAMIC VISION CORRECTION

(71) Applicant: OPTICA AMUKA (A.A.) LTD., Petach Tikva (IL)

(72) Inventors: Yoav Yadin, Ganey Tikva (IL); Yariv Haddad, Raanana (IL); Yuval Vardy, Tel Aviv (IL)

(73) Assignee: OPTICA AMUKA (A.A.) LTD., Petach Tikva (IL)

( * ) Notice: Subject to any disclaimer, the term of this patent is extended or adjusted under 35 U.S.C. 154(b) by 772 days.

(21) Appl. No.: 16/621,698

(22) PCT Filed: Jul. 5, 2018

(86) PCT No.: PCT/IB2018/054957
§ 371 (c)(1),
(2) Date: Dec. 12, 2019

(87) PCT Pub. No.: WO2019/012385
PCT Pub. Date: Jan. 17, 2019

(65) Prior Publication Data
US 2021/0149197 A1 May 20, 2021

Related U.S. Application Data

(60) Provisional application No. 62/586,909, filed on Nov. 16, 2017, provisional application No. 62/530,306, filed on Jul. 10, 2017.

(51) Int. Cl.
*G02B 27/01* (2006.01)
*G02B 30/36* (2020.01)
(Continued)

(52) U.S. Cl.
CPC ....... *G02B 27/0172* (2013.01); *G02B 27/281* (2013.01); *G02B 30/36* (2020.01);
(Continued)

(58) Field of Classification Search
CPC .. G02B 27/0172; G02B 27/281; G02B 30/36; G02B 2027/0185; G02F 1/29; G02F 2203/07; G02F 2203/50
(Continued)

(56) References Cited

U.S. PATENT DOCUMENTS 3,580,661 A 5/1971 Cooper, Jr. et al.
3,881,921 A 5/1975 Frank
(Continued)

FOREIGN PATENT DOCUMENTS

CN 201752480 U 3/2011
CN 102253563 A 11/2011
(Continued)

OTHER PUBLICATIONS

International Application # PCT/IB2020/054524 Search Report dated Aug. 31, 2020.
(Continued)

*Primary Examiner* — Joseph P Martinez
*Assistant Examiner* — Mitchell T Oestreich
(74) *Attorney, Agent, or Firm* — KLIGLER & ASSOCIATES PATENT ATTORNEYS LTD

(57) ABSTRACT

An augmented reality system (70, 100, 140, 180, 190) includes an augmented reality projector (72, 102, 142, 192) that is configured to project an image to an eye (82, 118, 154, 206) of an observer and to allow the observer to view a real scene (80, 116, 164, 204) through the projector. The system further includes first and second electrically-tunable dynamic lenses (74, 76, 104, 106, 144, 146, 194, 196), which are positioned respectively on opposing first and second
(Continued)

sides of the projector, and a controller (78, 110, 150, 198) that is coupled to the projector and the first and second electrically-tunable dynamic lenses. The controller is configured to receive an adjustable accommodation parameter and a specified distance of interest and to set respective first and second refractive powers of the first and second dynamic lenses responsively to the adjustable accommodation parameter and the distance.

16 Claims, 10 Drawing Sheets

(51) Int. Cl.
  G02B 27/28 (2006.01)
  G02F 1/29 (2006.01)
(52) U.S. Cl.
  CPC ........ *G02F 1/29* (2013.01); *G02B 2027/0185* (2013.01); *G02F 2203/07* (2013.01); *G02F 2203/50* (2013.01)
(58) Field of Classification Search
  USPC ....................................................... 359/279
  See application file for complete search history.

(56) References Cited

U.S. PATENT DOCUMENTS

| | | |
|---|---|---|
| 4,190,330 A | 2/1980 | Berreman et al. |
| 4,300,818 A | 11/1981 | Schachar |
| 4,584,592 A | 4/1986 | Tuan et al. |
| 4,853,764 A | 8/1989 | Sutter |
| 5,073,021 A | 12/1991 | Marron |
| 5,212,583 A | 5/1993 | Vali et al. |
| 5,359,444 A | 10/1994 | Piosenka et al. |
| 5,757,546 A | 5/1998 | Lipton et al. |
| 5,815,233 A | 9/1998 | Morokawa et al. |
| 5,861,936 A | 1/1999 | Sorensen |
| 5,861,940 A | 1/1999 | Robinson et al. |
| 6,152,563 A | 11/2000 | Hutchinson et al. |
| 6,243,063 B1 | 6/2001 | Mayhew et al. |
| 6,491,394 B1 | 12/2002 | Blum et al. |
| 6,501,443 B1 | 12/2002 | McMahon |
| 6,517,203 B1 | 2/2003 | Blum et al. |
| 6,553,504 B1 | 4/2003 | Katzenelson et al. |
| 6,857,741 B2 | 2/2005 | Blum et al. |
| 6,986,579 B2 | 1/2006 | Blum et al. |
| 7,475,984 B2 | 1/2009 | Blum et al. |
| 7,475,985 B2 | 1/2009 | Blum et al. |
| 7,497,121 B2 | 3/2009 | Okuda et al. |
| 7,517,083 B2 | 4/2009 | Blum et al. |
| 7,600,872 B2 | 10/2009 | Esser et al. |
| 7,728,949 B2 | 6/2010 | Clarke et al. |
| 8,052,278 B2 | 11/2011 | Bovet et al. |
| 8,675,148 B2 | 3/2014 | Takagi et al. |
| 8,690,321 B2 | 4/2014 | Lapstun |
| 8,773,629 B2 | 7/2014 | Uehara et al. |
| 8,896,772 B2 | 11/2014 | Fraval et al. |
| 8,922,902 B2 | 12/2014 | Blum et al. |
| 9,052,514 B2 | 6/2015 | Takama |
| 9,241,669 B2 | 1/2016 | Pugh et al. |
| 9,304,319 B2 | 4/2016 | Bar-Zeev et al. |
| 9,541,774 B2 | 1/2017 | Machida et al. |
| 9,958,703 B2 | 5/2018 | Pugh et al. |
| 10,036,901 B2 | 7/2018 | Yadin et al. |
| 10,268,050 B2 | 4/2019 | To et al. |
| 10,288,904 B2 | 5/2019 | Yadin et al. |
| 10,466,391 B2 | 11/2019 | Yadin et al. |
| 2002/0044125 A1 | 4/2002 | Maltese |
| 2003/0058406 A1 | 3/2003 | Blum et al. |
| 2003/0128416 A1 | 7/2003 | Caracci et al. |
| 2003/0210377 A1 | 11/2003 | Blum et al. |
| 2003/0231293 A1 | 12/2003 | Blum et al. |
| 2004/0041745 A1 | 3/2004 | Chen |
| 2004/0160389 A1 | 8/2004 | Suyama |
| 2004/0169630 A1 | 9/2004 | Ide |
| 2005/0146495 A1 | 7/2005 | Mackinnon et al. |
| 2005/0162367 A1 | 7/2005 | Kobayashi et al. |
| 2005/0168430 A1 | 8/2005 | Nishimura et al. |
| 2006/0034003 A1 | 2/2006 | Zalevsky |
| 2006/0092340 A1 | 5/2006 | Blum et al. |
| 2006/0126698 A1 | 6/2006 | Blum et al. |
| 2006/0164593 A1* | 7/2006 | Peyghambarian ........ G02F 1/29 349/200 |
| 2006/0164687 A1 | 7/2006 | Huang et al. |
| 2007/0052876 A1 | 3/2007 | Kaufman et al. |
| 2007/0146873 A1 | 6/2007 | Ortyn et al. |
| 2007/0236769 A1 | 10/2007 | Zalevsky |
| 2007/0236800 A1 | 10/2007 | Cakmakci et al. |
| 2007/0280626 A1 | 12/2007 | Haddock et al. |
| 2007/0290972 A1 | 12/2007 | Meredith |
| 2008/0239420 A1 | 10/2008 | McGrew |
| 2009/0096981 A1 | 4/2009 | Clarke et al. |
| 2009/0103044 A1 | 4/2009 | Duston et al. |
| 2009/0237575 A1 | 9/2009 | Tsi-shi |
| 2009/0279050 A1 | 11/2009 | McGinn et al. |
| 2010/0007804 A1 | 1/2010 | Guncer |
| 2010/0026920 A1 | 2/2010 | Kim et al. |
| 2010/0149444 A1 | 6/2010 | Hikmet et al. |
| 2010/0157181 A1 | 6/2010 | Takahashi |
| 2011/0018903 A1 | 1/2011 | Lapstun et al. |
| 2011/0037837 A1 | 2/2011 | Chiba et al. |
| 2011/0228181 A1 | 9/2011 | Jeong et al. |
| 2011/0234934 A1 | 9/2011 | Chang |
| 2011/0317128 A1 | 12/2011 | Guilloux et al. |
| 2012/0099040 A1 | 4/2012 | Robinson et al. |
| 2012/0120333 A1 | 5/2012 | Chen et al. |
| 2012/0133891 A1 | 5/2012 | Jiang |
| 2012/0147038 A1 | 6/2012 | Perez et al. |
| 2012/0194781 A1 | 8/2012 | Agurok |
| 2012/0212696 A1 | 8/2012 | Trajikovska et al. |
| 2012/0257131 A1 | 10/2012 | Galstian et al. |
| 2012/0300171 A1 | 11/2012 | Gupta et al. |
| 2013/0010256 A1 | 1/2013 | Haddock et al. |
| 2013/0027655 A1 | 1/2013 | Blum et al. |
| 2013/0128229 A1 | 5/2013 | Huang |
| 2013/0208224 A1 | 8/2013 | Kizu et al. |
| 2013/0215374 A1 | 8/2013 | Blum et al. |
| 2013/0250193 A1 | 9/2013 | Yun et al. |
| 2013/0250223 A1 | 9/2013 | Takagi et al. |
| 2014/0036172 A1 | 2/2014 | Trajkovska-Broach et al. |
| 2014/0036183 A1 | 2/2014 | Asatryan et al. |
| 2014/0118644 A1 | 5/2014 | Liu et al. |
| 2014/0347405 A1 | 11/2014 | Kumeta |
| 2015/0116304 A1 | 4/2015 | Lee et al. |
| 2015/0185503 A1 | 7/2015 | Tate et al. |
| 2015/0219893 A1 | 8/2015 | Chen et al. |
| 2015/0378240 A1 | 12/2015 | Wang et al. |
| 2016/0004128 A1 | 1/2016 | Wu |
| 2016/0161767 A1 | 6/2016 | Childers |
| 2016/0209647 A1 | 7/2016 | Fursich |
| 2016/0370605 A1 | 12/2016 | Ain-Kedem |
| 2017/0003519 A1 | 1/2017 | Burkert et al. |
| 2017/0068134 A1 | 3/2017 | Yadin et al. |
| 2017/0160518 A1 | 6/2017 | Lanman et al. |
| 2017/0184848 A1 | 6/2017 | Vallius |
| 2017/0219828 A1 | 8/2017 | Tsai et al. |
| 2017/0269453 A1 | 9/2017 | Galstian et al. |
| 2017/0276963 A1 | 9/2017 | Brennan et al. |
| 2018/0136486 A1 | 5/2018 | Macnamara et al. |
| 2018/0356652 A1 | 12/2018 | Shibuya et al. |
| 2019/0113772 A1 | 4/2019 | Yadin et al. |

FOREIGN PATENT DOCUMENTS

| | | |
|---|---|---|
| CN | 108845433 A | 11/2018 |
| EP | 0595705 A1 | 5/1994 |
| EP | 1050775 A1 | 11/2000 |
| EP | 1760515 A2 | 3/2007 |
| EP | 2309310 A1 | 4/2011 |
| EP | 2503787 A1 | 9/2012 |
| EP | 2682810 A1 | 1/2014 |
| JP | S62209412 A | 9/1987 |

(56) References Cited

FOREIGN PATENT DOCUMENTS

| | | |
|---|---|---|
| JP | H0289017 A | 3/1990 |
| JP | H036518 A | 1/1991 |
| JP | 2003091013 A | 3/2003 |
| JP | 2011203457 A | 10/2011 |
| JP | 2012141552 A | 7/2012 |
| RU | 2541819 C2 | 2/2015 |
| WO | 8102795 A1 | 10/1981 |
| WO | 9941639 A1 | 8/1999 |
| WO | 03077012 A2 | 9/2003 |
| WO | 2008032061 A2 | 3/2008 |
| WO | 2011075834 A1 | 6/2011 |
| WO | 2012120470 A1 | 9/2012 |
| WO | 2014063432 A1 | 5/2014 |
| WO | 2017003330 A1 | 1/2017 |
| WO | 2017049072 A1 | 3/2017 |
| WO | 2017158486 A1 | 9/2017 |

OTHER PUBLICATIONS

U.S. Appl. No. 16/085,581 Office Action dated Nov. 3, 2020.
EP Application # 20199016.5 Search Report dated Nov. 30, 2020.
CA Application # 2,947,809 Office Action dated Apr. 19, 2021.
CA Application # 2,939,664 Office Action dated Apr. 20, 2021.
U.S. Appl. No. 16/085,581 Office Action dated May 7, 2021.
U.S. Appl. No. 16/566,910 Office Action dated Jun. 24, 2021.
EP Application # 18869416 Search Report dated Jun. 16, 2021.
Sensomotoric Instruments GMBH, "SMI Eye Tracking Glasses-Discover What is Seen", pp. 1-2, 2011.
Lensvector, "Breakthrough Autofocus Technology", 1 page, 2010.
Loktev et al., "Wave front control systems based on modal liquid crystal lenses", Review of Scientific Instruments, vol. 71, No. 9, pp. 3290-3297, Sep. 1, 2000.
Pixeloptics Inc., "The Evolution of Technology—emPower!—The world's First Electronic Focusing Eyewear", 1 page, 2009.
Brunosan., "Headaches in 3D", Saepe cadendo, pp. 1-4, Jan. 29, 2011.
Naumov et al., "Liquid-crystal adaptive lenses with modal control", Optics Letters, vol. 23, No. 13, pp. 992-994, Jul. 1, 1998.
Varioptic Sa, "Liquid Lens for Auto Focus (AF)", pp. 1-3, Jul. 31, 2012.
Bagwell et al., "Liquid crystal based active optics", SPIE Proceedings Novel Optical Systems Design and Optimization IX, vol. 6289, pp. 1-12, Sep. 5, 2006.
Holoeye Photonics AG, "LC 2002: Translucent Spatial Light Modulator", pp. 1-2, May 12, 2012.
Varioptic Sa, "The Liquid Lens Technology", pp. 1-2, Dec. 2, 2010.
Longtech Optics Co Ltd., "LCD Multiplex Ratio", 1 page, year 2008.
Stiefelhagen et al., "A Model-Based Gaze Tracking System", International Journal of Artificial Intelligence Tools, vol. 6, No. 2, pp. 193-209, year 1997.
Baluja et al., "Non-Intrusive Gaze Tracking Using Artificial Neural Networks", CMU Technical Report, CMU-CS-94-102; pp. 1-14, Jan. 5, 1994.
Jacob, R., "The Use Of Eye Movements In Human-Computer Interaction Techniques: What You Look At Is What You Get", ACM Transactions On Information Systems, vol. 9, No. 3, pp. 152-169, Apr. 1991.
Heinzmann et al., "3-D Facial Pose And Gaze Point Estimation Using A Robust Real-Time Tracking Paradigm", Proceedings of the Third International Conference on Automatic Face and Gesture Recognition, pp. 142-147, Apr. 14-16, 1998.
Wang et al., "Liquid crystal blazed grating beam deflector", Part of the SPIE Conference on Advanced OpticalMemories and Interfaces to Comouter Storage, San Diego, USA, vol. 3468, pp. 43-54, Jul. 1998.
Goodman, "Introduction to Fourier Optics", 3rd edition, published by Roberts & Company, pp. 1-98 year 2005.
Boulder Nonlinear Systems, "Spatial Light Modulators—XY Phase Series", 1 page, 2007.
Boulder Nonlinear Systems, "Spatial Light Modulators—XY Phase Series—draft Specifications", 1 page, 2007.
Holmarc Opto-Mechantronics Pvt. Ltd., "Lab Equipment for Research and Manufacturing", pp. 1-24 (relevant p. 18 "Bench Top Rubbing Machine"), Jan. 23, 2015.
Yadin et al., U.S. Appl. No. 16/081,927 filed Sep. 3, 2018.
International Application # PCT/IB2019/056243 Search report dated Nov. 3, 2019.
Indian Application # 201647032238 office action dated Feb. 14, 2019.
U.S. Appl. No. 16/085,581 Office Action dated Sep. 20, 2021.
EP Application # 21202537.3 Search Report dated Nov. 4, 2021.
EP Application # 19841482.3 Search Report dated May 13, 2022.
U.S. Appl. No. 16/648,695 Office Action dated Jun. 9, 2022.
International Application # PCT/IB2022/052812 Search Report dated Jun. 30, 2022.
U.S. Appl. No. 17/340,138 Office Action dated Feb. 24, 2023.
U.S. Appl. No. 17/521,887 Office Action dated Mar. 23, 2023.
EP Application # 20819033.0 Search Report dated May 17, 2023.

* cited by examiner

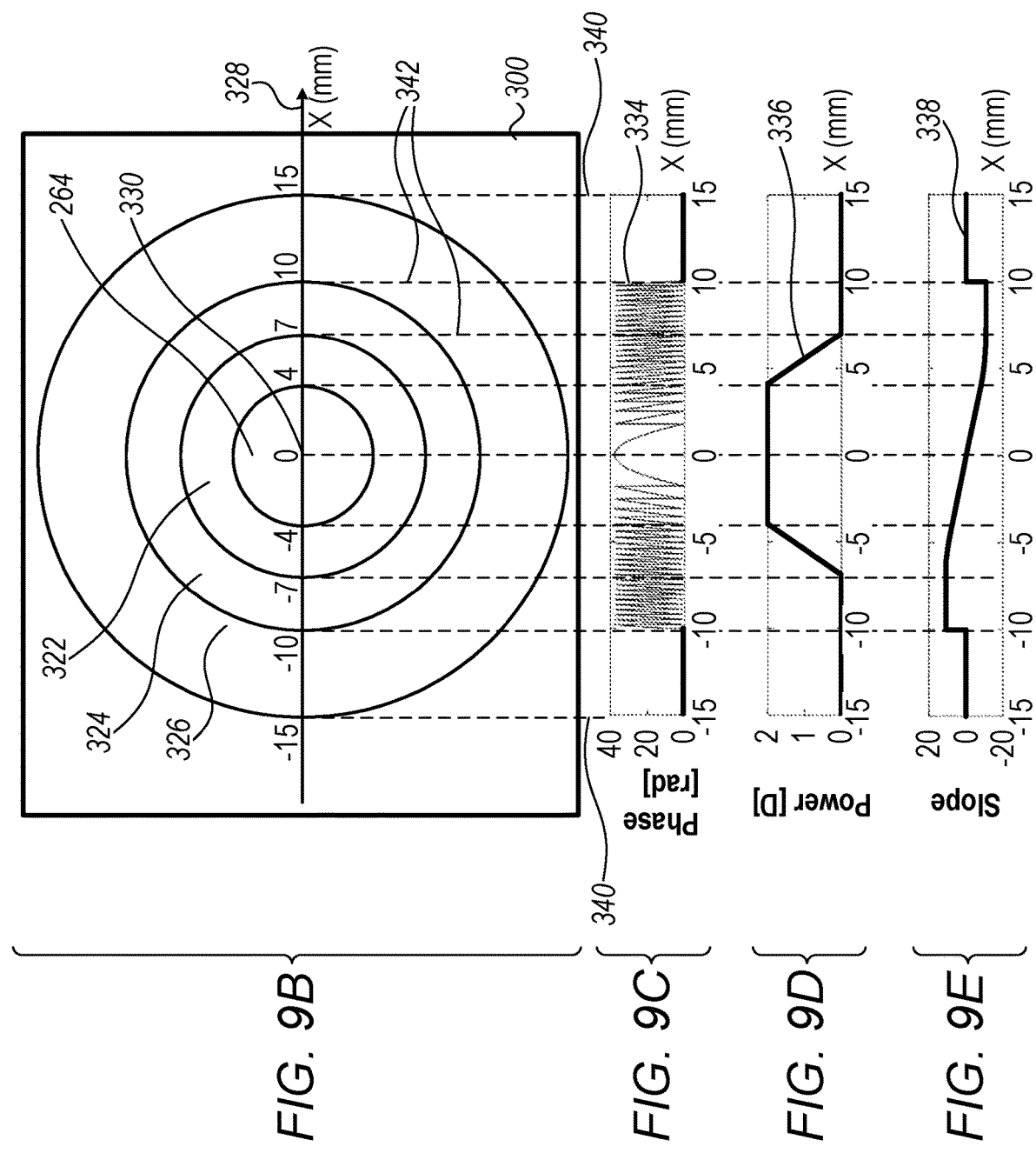

VIRTUAL REALITY AND AUGMENTED REALITY SYSTEMS WITH DYNAMIC VISION CORRECTION

CROSS-REFERENCE TO RELATED APPLICATION

This application claims the benefit of U.S. Provisional Patent Application 62/530,306, filed Jul. 10, 2017, and of U.S. Provisional Patent Application 62/586,909, filed Nov. 16, 2017, which are incorporated herein by reference.

FIELD OF THE INVENTION

The present invention relates generally to optoelectronic systems, and particularly to virtual and augmented reality systems.

BACKGROUND

Virtual reality systems show a user a virtual scene, typically using a near-eye display with collimating optics to enable sharp vision from a close distance. Augmented reality systems show a user virtual content over a real-world scene, typically using a transparent (or semi-transparent) light guide that enables viewing of the real world through it, and projects the virtual content into the user's eyes.

United States Patent Application Publication 2011/0018903 describes an augmented reality device for inserting virtual imagery into a user's view of their physical environment. The device comprises: a see-through display device including a wavefront modulator; a camera for imaging a surface in the physical environment; and a controller.

U.S. Pat. No. 9,304,319 describes an augmented reality system that provides improved focus of real and virtual objects. A see-through display device includes a variable focus lens a user looks through. A focal region adjustment unit automatically focuses the variable focus lens in a current user focal region.

United States Patent Application Publication 2017/0160518 describes a virtual reality headset that displays a three-dimensional virtual scene and includes a varifocal element to dynamically adjust a focal length of an optics block included in the virtual reality headset based on a location in the virtual scene where the user is looking.

SUMMARY

Embodiments of the present invention that are described hereinbelow provide improved optics for dynamic vision correction, particularly for use in virtual reality and augmented reality systems.

There is therefore provided, in accordance with an embodiment of the invention, an optical system, which includes a display configured to present a stereoscopic pair of left and right images, with at least one object having a specified virtual distance, to left and right eyes, respectively, of an observer. The system further includes left and right electrically-tunable dynamic lenses configured to be interposed between the display and the left and right eyes, respectively, and a controller coupled to the projector and the dynamic lenses. The controller is configured to receive an input that is indicative of a power of accommodation of the observer and to set respective refractive powers of the dynamic lenses responsively to the power of accommodation and the specified virtual distance.

There is also provided, in accordance with an embodiment of the invention, an augmented reality (AR) system, which includes an AR projector configured to project an image to an eye of an observer and to allow the observer to view a real scene through the projector. The system further includes first and second electrically-tunable dynamic lenses, positioned respectively on opposing first and second sides of the projector, and a controller coupled to the projector and the first and second electrically-tunable dynamic lenses. The controller is configured to receive an adjustable accommodation parameter and a specified distance of interest and to set respective first and second refractive powers of the first and second dynamic lenses responsively to the adjustable accommodation parameter and the distance.

In a disclosed embodiment, at least one of the first and second electrically-tunable dynamic lenses is a compound dynamic lens.

In another embodiment, the first electrically-tunable dynamic lens is interposed between the projector and the eye, and the controller is configured to receive an indication of a direction of view of the eye, and to shift an optical center of the first electrically-tunable dynamic lens responsively to the direction of view.

In a further embodiment, the AR projector is configured to project the image with a first polarization, and the first and second electrically-tunable dynamic lenses have optical power at the first polarization, but not at a second polarization orthogonal to the first polarization. Additionally, the system includes a polarizer configured to block light at the second polarization from reaching the eye. Alternatively, the system includes a third electrically-tunable dynamic lens, which is positioned between the real scene and the eye and has optical power at the second polarization, but not at the first polarization.

In yet another embodiment, the AR projector is configured to project the image with a first polarization, and the first electrically-tunable dynamic lens has optical power at the first polarization, but not at a second polarization orthogonal to the first polarization, while the second electrically-tunable dynamic lens has optical power at the second polarization, but not at the first polarization. Additionally, the system includes a polarizer configured to block light emitted from the real scene at the first polarization from reaching the eye.

In a further embodiment, the first and second electrically-tunable dynamic lenses are configured to operate as Fresnel-lenses.

There is additionally provided, in accordance with an embodiment of the invention, an optical device, which includes at least one electro-optical layer, having an effective local index of refraction at any given location within an active area of the electro-optical layer that is determined by a voltage waveform applied across the electro-optical layer at the location. The device further includes conductive electrodes extending over opposing first and second sides of the at least one electro-optical layer, and a controller coupled to apply respective control voltage waveforms to the electrodes so as to generate a specified phase modulation profile in the electro-optical layer. The profile includes a central zone containing a Fresnel-pattern having a parabolic optical phase as a function of a radial coordinate so as to define a Fresnel-lens, surrounded concentrically by one or more annular zones with smoothly-varying optical phase.

In a disclosed embodiment, the one or more annular zones include at least first and second annular zones. The first annular zone is adjacent to the central zone and is configured to provide a continuous variation of a radial second derivative of the optical phase from the central zone to the second annular zone. The second annular zone surrounds the first annular zone and has a constant radial derivative of the optical phase.

In a further embodiment, the one or more annular zones include a third annular zone surrounding the second annular zone and having a constant optical phase.

There is further provided, in accordance with an embodiment of the invention, an optical system, including a projector configured to project an image to an eye of an observer, an electrically-tunable dynamic lens interposed between the projector and the eye, and a control unit coupled to control the projector and the electrically-tunable dynamic lens. The control unit is configured to modify digitally the image projected by the projector responsively to a configuration of the electrically-tunable dynamic lens so as to compensate for at least one optical aberration of the electrically-tunable dynamic lens.

In a disclosed embodiment, the projector is a virtual reality (VR) projector. Alternatively, the projector is an augmented reality (AR) projector.

In a further embodiment, at least one optical aberration of the electrically-tunable dynamic lens is a magnification and the controller is configured to apply an equal but opposite magnification to the image projected by the projector. Additionally or alternatively, the at least one optical aberration of the electrically-tunable dynamic lens is a distortion and the controller is configured to apply an equal but opposite distortion to the image projected by the projector.

Further additionally or alternatively, the at least one optical aberration of the electrically-tunable dynamic lens is a prismatic effect and the controller is configured to shift the image projected by the projector by an equal but opposite amount to the prismatic effect. Additionally or alternatively, the at least one optical aberration of the electrically-tunable dynamic lens is a lateral chromatic aberration and the controller is configured to apply a local shift to the image projected by the projector that is equal but opposite to the lateral chromatic aberration. Further additionally or alternatively, the at least one optical aberration of the electrically-tunable dynamic lens is a color artifact of a Fresnel-lens characterized by a point spread function (PSF) of the Fresnel-lens as a function of a lateral position in the image and of a local spectral content of the image and the controller is configured to apply to the image projected by the projector a filter that is inverse to the PSF.

There is additionally provided, in accordance with an embodiment of the invention, a method for vision correction. The method includes providing a compound lens that includes a static lens having a negative optical power and an electrically-tunable dynamic lens in mutually proximity. The method further includes tuning a refractive power of the electrically-tunable dynamic lens over a range of optical powers, so as to refract light passing through the compound lens with a net optical power given by a sum of the negative optical power of the static lens and the refractive power of the electrically-tunable dynamic lens.

In a disclosed embodiment, providing a compound lens includes defining positive and negative extremes of a dynamic range of the net optical power, and selecting the negative optical power of the static lens to be closer to the negative extreme than to the positive extreme. Additionally or alternatively, selecting the negative optical power includes setting the negative optical power to be equal to the negative extreme.

There is also provided, in accordance with an embodiment of the invention, a method for displaying images, which includes presenting on a display a stereoscopic pair of left and right images, with at least one object having a specified virtual distance, to left and right eyes, respectively, of an observer. Left and right electrically-tunable dynamic lenses are interposed between the display and the left and right eyes, respectively. An input that is indicative of a power of accommodation of the observer is received, and respective refractive powers of the dynamic lenses are set responsively to the power of accommodation and the specified virtual distance.

There is further provided, in accordance with an embodiment of the invention, a method for displaying an image, which includes projecting an image to an eye of an observer using an augmented reality (AR) projector while allowing the observer to view a real scene through the projector. First and second electrically-tunable dynamic lenses are positioned respectively on opposing first and second sides of the projector. An adjustable accommodation parameter and a specified distance of interest are received, and respective first and second refractive powers of the first and second dynamic lenses are set responsively to the adjustable accommodation parameter and the distance.

There is moreover provided, in accordance with an embodiment of the invention, a method for operating an optical device, which includes providing at least one electro-optical layer, having an effective local index of refraction at any given location within an active area of the electro-optical layer that is determined by a voltage waveform applied across the electro-optical layer at the location, with conductive electrodes extending over opposing first and second sides of the at least one electro-optical layer. Respective control voltage waveforms are applied to the electrodes so as to generate a specified phase modulation profile in the electro-optical layer, the profile including a central zone containing a Fresnel-pattern having a parabolic optical phase as a function of a radial coordinate defining a Fresnel-lens, surrounded concentrically by one or more annular zones with smoothly-varying optical phase.

There is furthermore provided, in accordance with an embodiment of the invention, a method for displaying an image, which includes projecting, using a projector, an image to an eye of an observer, and interposing an electrically-tunable dynamic lens between the projector and the eye. The projected image is digitally modified responsively to a configuration of the electrically-tunable dynamic lens so as to compensate for at least one optical aberration of the electrically-tunable dynamic lens.

The present invention will be more fully understood from the following detailed description of the embodiments thereof, taken together with the drawings in which:

BRIEF DESCRIPTION OF THE DRAWINGS

FIGS. 9A-E are plots that schematically illustrate the design of a dynamic Fresnel-lens, in accordance with an embodiment of the invention.

DETAILED DESCRIPTION OF EMBODIMENTS

Virtual Reality and Augmented Reality Systems

Figure 1:
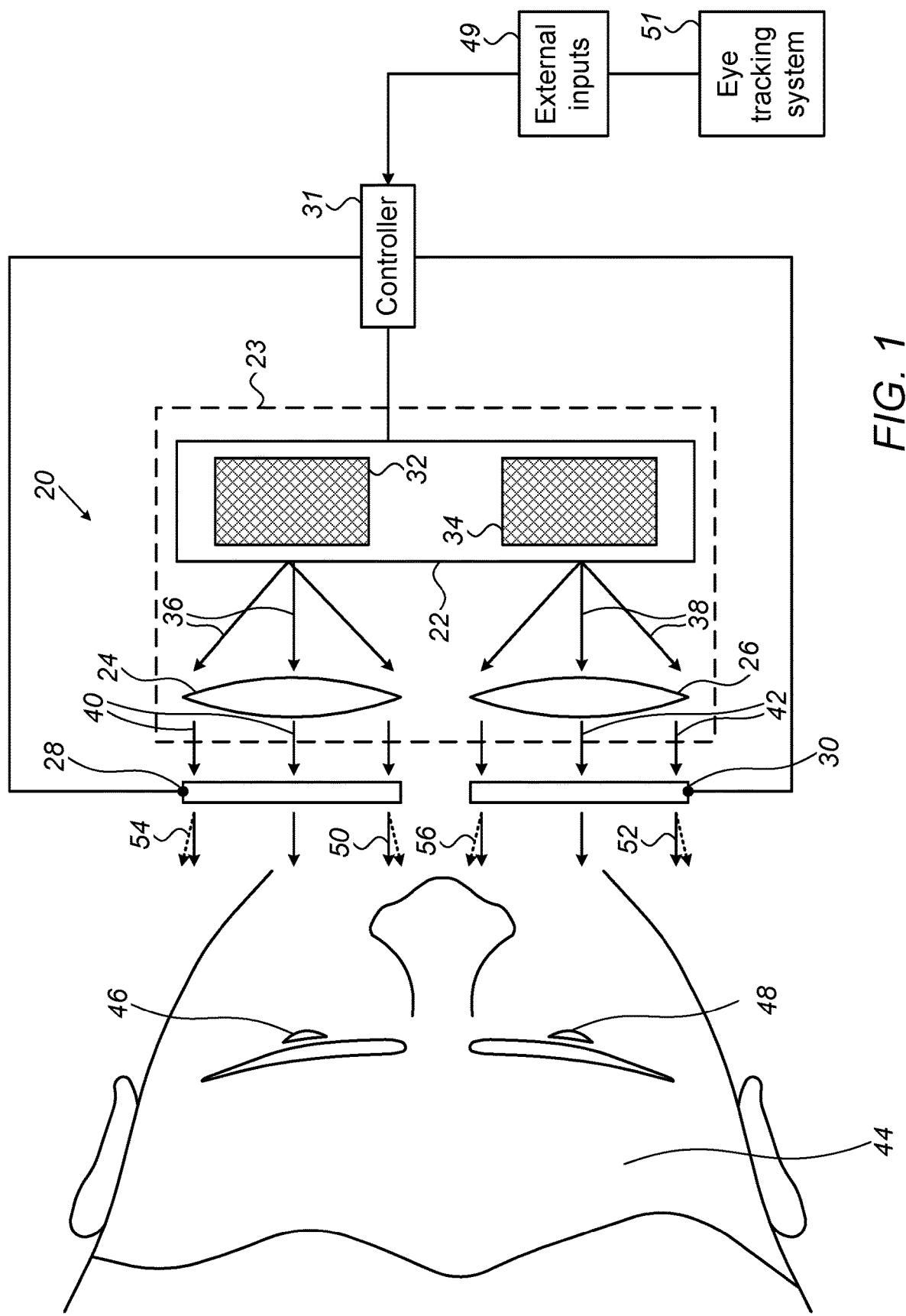
FIG. 1 is a schematic top view of a virtual reality system, in accordance with an embodiment of the invention.

The user experience of virtual reality (VR) and augmented reality (AR) systems depends on the user's vision. Typically such systems, including the systems described below, assume that a user does not require vision correction for far distances. Users that do require such vision correction are required to use their glasses or alternative vision correction lenses.

The human vision system has the ability to change dynamically (accommodate) the optical power of the eye according to the distance to a viewed scene or object. (In the following, the terms "optical power" and "refractive power" are used interchangeably.) However, this ability of accommodation degrades with age, leading to a condition of the eye called presbyopia. While this process starts at an early age, it is typically noticeable when the accommodation range drops below 2-3 diopters, requiring vision correction when viewing objects at close distances, such as during reading.

An optical system positioned opposite the eyes of a user is commonly configured into either a monocular or binocular system, wherein one eye looks through a monocular system (monocular viewing), and both eyes look through a binocular system (binocular viewing). A binocular system may be made up of two identical or similar monocular systems.

VR systems typically use a display positioned opposite to the user's eyes (one or both), with collimating optics to enable the user to view a display at such a short distance. Typically the optical system is designed so that the viewer has to focus to a far distance (close to infinity in terms of focus), in order to view a sharp image. Stereoscopic VR systems are binocular systems, displaying a different image to each eye, and triggering the eyeballs to converge or diverge so that their lines-of-sight intersect at a given distance, commonly called the vergence distance, in order to fuse the two images into one image. This results in an illusion of three-dimensional virtual content. The conflict between the vergence distance of the stereoscopic virtual image and the system's actual focal distance, known as the vergence-accommodation conflict, can cause blurred images, nausea, eye fatigue, and discomfort for some users.

One way of addressing the vergence-accommodation conflict is by placing dynamic lenses (meaning, in the context of the present description and the claims, lenses whose optical power may be controlled by an electrical signal) between the display and the eyes. For this purpose, embodiments of the present invention may apply the sort of electrically-tunable dynamic lenses that are described in PCT patent application PCT/IB2013/058989, whose disclosure is incorporated herein by reference. These lenses comprise an electro-optical layer, such as a liquid crystal, meaning that the local effective index of refraction at any given location within the active area of the layer is determined by the voltage applied across the layer in the vicinity of the location. An array of excitation electrodes extends over one or both sides of the active area of the electro-optical layer. A controller applies respective control voltages to the excitation electrodes in order to generate the desired phase profile and thus emulate the performance of a lens with the desired (adjustable) optical power and optical axis.

A virtual scene displayed to a user can include one or more virtual objects, positioned at one or more virtual distances from the user. When a virtual object is displayed at a short virtual distance, for example 50 cm, the user, when viewing the object, will accommodate to that distance with an accommodation of +2 diopters. The dynamic lens is set to −2 diopters in order to cancel the user's accommodation, resulting in a sharp view of the virtual content. If the display is polarized, a polarization-dependent dynamic lens can be used.

By dynamically changing the focal distance of the lenses according to the distance of the virtual object of interest, the vergence-accommodation conflict can be mitigated and even eliminated. Determining the relevant object distance can be based on the knowledge of the content of the virtual scene, on the output of an eye tracking system detecting gaze direction or vergence, or other indicators.

A user with no visual accommodation (fully developed presbyopia) has no use for a dynamic lens between the display and the eyes, as he/she views both far and near scenes of the virtual object with unaccommodated eyes. Thus, a lens between the display and the eyes is of little or no use in relieving the possible discomfort of the user for viewing both far and near virtual scenes with his/her eyes focused at infinity.

A different situation arises with a user who has a limited (but non-zero) accommodation, typically less than 3 diopters. This user may still benefit from a vision correction in order not to experience vergence-accommodation conflict, but with a smaller amount of correction than would be required for a user with a large range of accommodation.

AR systems are see-through systems that overlay a virtual scene on the real-world scene. A binocular AR system may require a similar correction for vergence-accommodation conflict to a VR system. In addition, both binocular and monocular AR systems should avoid a conflict between the accommodation required for the virtual scene and for the real scene, referred to as virtual-real focus conflict. Consequently, a dynamic focus correction can be useful in both binocular and monocular AR systems.

The potential visual conflicts for both VR systems and AR systems are summarized in Table 1, below.

TABLE 1

Potential visual conflicts for VR and AR systems

| | VR system | AR system |
|---|---|---|
| Binocular | vergence-accommodation conflict | vergence-accommodation conflict + virtual-real focus conflict |
| Monocular | — | virtual-real focus conflict |

The embodiments of the present invention that are described herein address the problems described above by providing a dynamic vision correction lens that is configured to focus so that it takes into account both the distance of the object (real and/or virtual) and the power of accommodation of the user.

In the disclosed embodiments, a VR or AR system comprises a display, displaying either a single image to one of the eyes of the user (monocular viewing), or two different images to the left and right eyes of the user (binocular viewing). The term "display" is used here to describe a device emitting modulated light, which results in a virtual scene that is viewed by the user, such as a display panel (LCD or OLED, for example), or a projector (LCOS, for example). One or two collimating lenses, respectively, collimate light from the display (so that light rays are parallel when exiting the lens), thus requiring the user to focus to a far distance to view the display. One or two dynamic lenses are respectively positioned in front of the user's eye or eyes.

The system receives information on the direction and the distance of the object of interest (based on the virtual content, eye tracking information or other methods), as well as information on the user's ability to accommodate, based on user input and/or testing. The information on the user's ability to accommodate can take the form of an adjustable accommodation parameter, which indicates, for example, the range of distances or optical powers over which the user's eyes are capable of accommodating. The system thus configures the dynamic lens or lenses according to the object distance of interest and the user's ability to accommodate.

VR System

FIG. 1 is a schematic top view of a VR system 20, in accordance with an embodiment of the invention.

VR system 20, designed for binocular viewing, comprises a display 22, left and right collimating lenses 24 and 26, and left and right dynamic lenses 28 and 30, respectively. Display 22 and collimating lenses 28 and 30 together make up a VR projector 23. Display 22 and dynamic lenses 28 and 30 are coupled to a controller 31, which drives display 22 to display a left image 32 and a right image 34 of a virtual scene such that these images form a stereoscopic pair, i.e., images that will give a user 44 a subjective impression of viewing a three-dimensional virtual scene including at least one virtual object located at a distance $L_{SCENE}$ from the user. The virtual scene can include additional virtual objects at other distances, in which case the system determines the object of interest (the object the user is looking at) by using one of the methods described below. The distance $L_{SCENE}$ is used here to refer to the distance from the user of the object of interest.

Left and right images 32 and 34, respectively, are projected to infinity by collimating lenses 24 and 26, as shown by rays 36 and 38 originating from the images and by rays 40 and 42 collimated by the lenses. User 44 views left and right images 32 and 34 with his/her left and right eyes 46 and 48 through respective dynamic lenses 28 and 30.

Controller 31 also determines and sets the focal power of left and right dynamic lenses 28 and 30 so as to cancel the accommodation of user 44, enabling sharp vision of the virtual image (which is projected from a far focal plane, close to infinity). Dynamic lenses 28 and 30 are thus configured to an optical power of $-D_{ACOM}$, where $D_{ACOM}$ is the actual accommodation by eyes 46 and 48 of user 44. $D_{ACOM}$ is determined from a combination of $L_{SCENE}$, expressed in diopters as $D_{SCENE}$ (=$1/L_{SCENE}$), and of a user-dependent accommodation response function $D_{USER}(D_{SCENE})$, which gives a parameter describing the amount of accommodation of eyes 46 and 48 of user 44 when viewing an object at a distance $1/D_{SCENE}$.

The accommodation response function $D_{USER}(D_{SCENE})$ can be determined by testing the accommodation of eyes 46 and 48 of user 44. User 44 is shown virtual objects at two or more virtual distances, and is asked to view the objects one at a time and tune dynamic lenses 28 and 30 to optimize the image sharpness for each object, for example by interaction with a user interface (not shown) of controller 31. The optimal sharpness is achieved when dynamic lenses 28 and 30 are set to $-D_{USER}(D_{SCENE})$. Controller 31 can then use these measurements (and interpolations as necessary) to determine the accommodation of eyes 46 and 48 of user 44 given the distance $L_{SCENE}$ of the viewed object. Alternatively, user 44 can be prompted to input his/her maximal accommodation ability $D_{USER,MAX}$, and the his/her accommodation response function can be approximated by $D_{USER}(D_{SCENE})=\min\{D_{SCENE}, D_{USER,MAX}\}$.

In an alternative embodiment, controller 31 receives the distance $L_{SCENE}$, through external inputs 49, from an eye tracking system 51, which detects the gaze direction of each eye, and can thus find the vergence and/or identify the virtual object at which the user is looking.

For example, when controller 31 determines that the distance to the virtual object $L_{SCENE}$ is 50 cm ($D_{SCENE}=2$ diopters), it will set the focus of dynamic lenses 28 and 30 to $-2$ diopters for a user with good accommodation (>2 diopters), $-1$ diopter for a user who has weaker accommodation and accommodates only 1 diopter when viewing at a 50 cm distance, and 0 diopters for a user with no accommodation at all (fully developed presbyopia).

Setting the focus of dynamic lenses 28 and 30 changes how light rays emerge from the lenses. Light rays emerging from dynamic lenses 28 and 30 are either parallel to respective incident collimated rays 40 and 42 (when the lenses are configured to zero power), as indicated by rays 50 and 52 with solid lines, or diverging from rays 40 and 42 (when the lenses are configured for negative optical power), as indicated by rays 54 and 56 with dashed lines.

The above-described dynamic setting of the foci of dynamic lenses 28 and 30, due to being tailored for the individual power of accommodation of user 44, reduces the vergence-accommodation conflict experienced by the user while viewing left and right images 32 and 34, respectively, using VR system 20.

Controller 31 typically comprises a programmable processor, which is programmed in software and/or firmware to carry out the functions that are described herein. Alternatively or additionally, controller 31 comprises hard-wired and/or programmable hardware logic circuits, which carry out at least some of the functions of the controller. Although controller 31 is shown in the figures, for the sake of simplicity, as a single, monolithic functional block, in practice the controller may comprise a single chip or a set of two or more chips, with suitable interfaces for receiving and outputting the signals that are illustrated in the figures and are described in the text. The controllers shown and described in the context of the embodiments that follow are of similar construction.

AR Systems

The AR systems of FIGS. 2-6 are shown as monocular systems. A pair of each of these monocular systems may be assembled into a binocular system, and can be used to project stereoscopic images for viewing by the user. When used as monocular systems, the AR systems described in FIGS. 2-6 can alleviate the virtual-real focus conflict, whereas when assembled into binocular systems, they can alleviate both the vergence-accommodation and the virtual-real focus conflicts.

Figure 2:
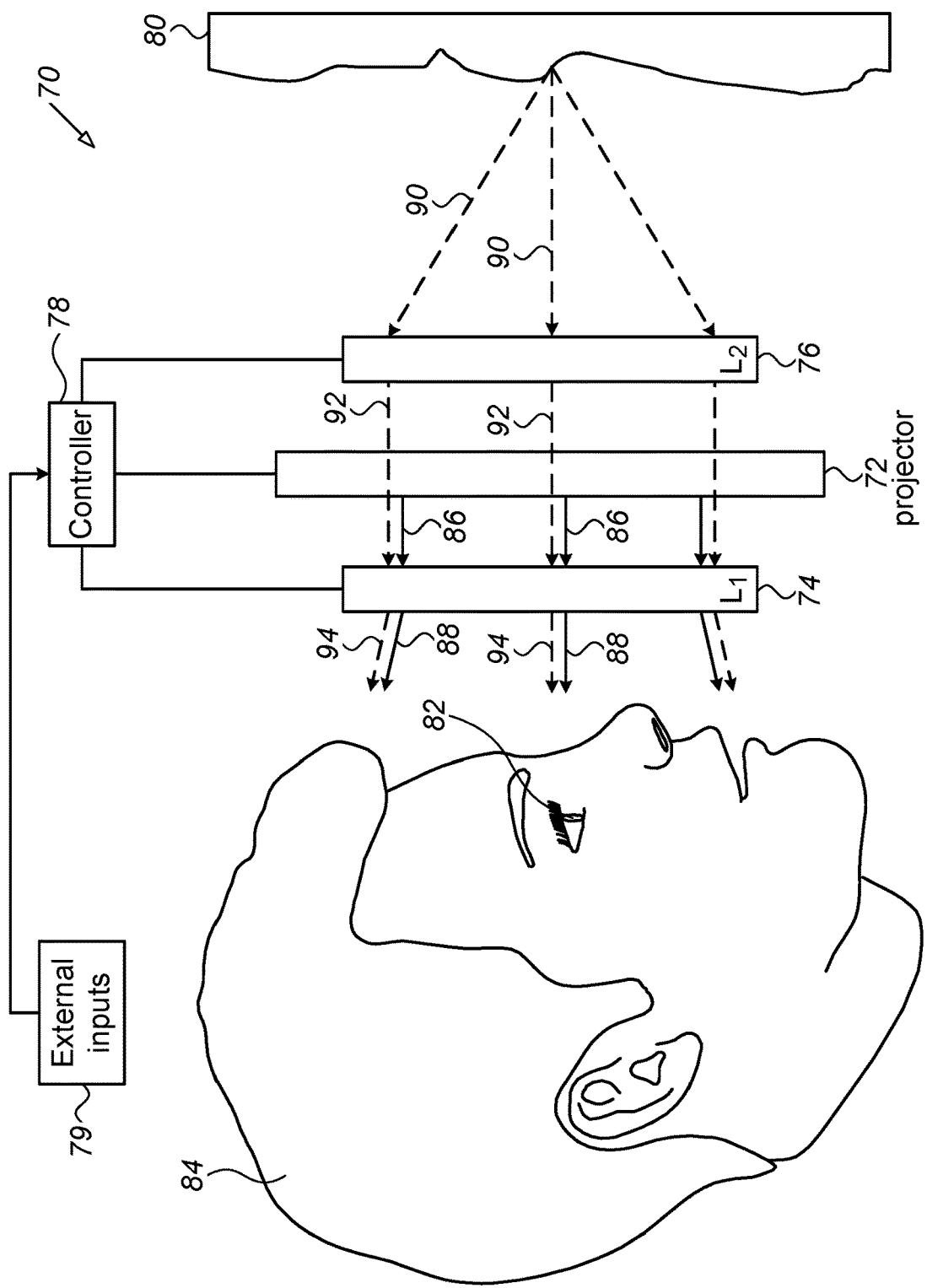
FIG. 2 is a schematic side view of an augmented reality system, in accordance with an embodiment of the invention.

FIG. 2 is a schematic side view of an AR system 70, in accordance with an embodiment of the invention.

AR system 70 comprises an AR projector 72, a first dynamic lens 74 ($L_1$), a second dynamic lens 76 ($L_2$), with the AR projector and the two dynamic lenses driven by a controller 78. Controller 78 receives from external inputs 79 information about the distance of interest (the distance to the object the user is looking at), as well as about the power of accommodation of a user 84. AR projector 72 projects the image of a virtual scene (not shown) with collimated rays (as if the virtual scene were at infinity) towards user 84. AR projector 72 is also transparent or partially transparent to light propagating from real scene 80 towards an eye 82 of user 84, thus working in a see-through mode.

Eye tracking can be used to determine the distance of interest. For example, the vergence of the user can be measured, directly indicating the distance of interest. Alternatively, gaze tracking can be used to determine the direction to which the user is looking. If the user is viewing a virtual object the system can determine, based on the gaze direction and image content, which object the user is viewing, and from that determine the distance of interest (which in this case equals the virtual object distance). AR systems typically map the surroundings of the user in three dimensions to enable accurate registration of the virtual content to real objects. Therefore, if the user is viewing a real object, the system can also determine, based on the gaze direction, which object the user is viewing, and from that, along with the three-dimensional mapping of the surroundings, determine the distance of interest (which in this case equals the real object distance).

A typical AR projector 72 (details not shown for the sake of simplicity) comprises a waveguide, into which an image display is coupled by suitable optics to feed the image of the virtual scene into the waveguide. The surface of the waveguide facing the user comprises a structure, such as a hologram or a diffraction grating with partially reflecting facets, to deflect the image of the virtual scene towards the user. The term "projector," in the context of the present description and the claims, should be understood as including such waveguides and other types of optical components that are used in projecting images toward the user's eye or eyes. AR projector 72 is typically configured as eyeglasses, such as HoloLens, available from Microsoft Corporation (Redmond, Wash., USA), or the DK-Vision development kit available from Lumus (Ness Ziona, Israel).

The objective of AR system 70 is to superimpose the virtual scene, displayed by AR projector 72, onto real scene 80 so that user 84 perceives both scenes simultaneously. Both the virtual and the real scene can include several objects located at different distances from the user. When viewing an object at a certain distance, whether virtual, real or both, the user should see the object in sharp focus. Consequently, controller 78 adjusts the focal distance for the virtual scene to match the distance of interest $L_{SCENE}$.

Similarly to VR system 20, controller 78 focuses first dynamic lens 74 to optical power of $D_{L1}=-D_{USER}(D_{SCENE})$ in order to match between the accommodation of eye 82, and the distance $L_{SCENE}$ ($=1/D_{SCENE}$). First dynamic lens 74 receives parallel (collimated) rays 86 emanating from AR projector 72 and refracts them according to its optical power $D_{L1}$ into diverging rays 88. (Both rays 86 and 88 are shown as solid lines.)

Rays 90 emanating from an object in a real scene 80, positioned at a distance $L_{SCENE}$ from the user, must ultimately reach eye 82 of user 84 with the same divergence as rays 88, in order for the user to see both the virtual scene and the real scene in a sharp focus. Therefore second dynamic lens 76 is focused to a focal power of $D_{L2}=D_{SCENE}$, so that rays 90 are refracted by the second dynamic lens to collimated rays 92, and then by first dynamic lens 74 to rays 94 with the same divergence as rays 88. (Rays 90, 92, and 94 are shown as dashed lines.) As an example, consider an augmented scene with a real and a virtual object, both positioned at a distance $L_{SCENE}=50$ cm. Were user 84 to have full power of accommodation, eye 82 would accommodate to +2 diopters, and first dynamic lens 74 would be set to an optical power of −2 diopters, to enable sharp view of the virtual object. Second dynamic lens 76 is set to +2 diopters so that rays 92 exit from it as a parallel ray bundle (this enables sharp view of the real object).

For user 84 with fully developed presbyopia, i.e., no power of accommodation, first dynamic lens 74 would be set for zero optical power, but second dynamic lens 76 is still set to +2 diopters. In this case, second dynamic lens 76 functions similarly to reading glasses for a presbyopic person.

For user 84 with some power of accommodation, for example +1 diopters, first dynamic lens 74 would be set for −1 diopters, but second dynamic lens 76 is again set to +2 diopters.

In summary, first dynamic lens 74 is focused, based on the power of accommodation of user 84, to optical power of $D_{L1}=-D_{USER}(D_{SCENE})$, while second dynamic lens 76 is focused to an optical power of $D_{L2}=D_{SCENE}$.

The above-described adjustments of the optical powers of first and second dynamic lenses 74 and 76, respectively, are required for both monocular and binocular use of AR system 70, due to the requirement that user 84 see both the virtual scene and real scene 80 simultaneously in sharp focus.

Figure 3:
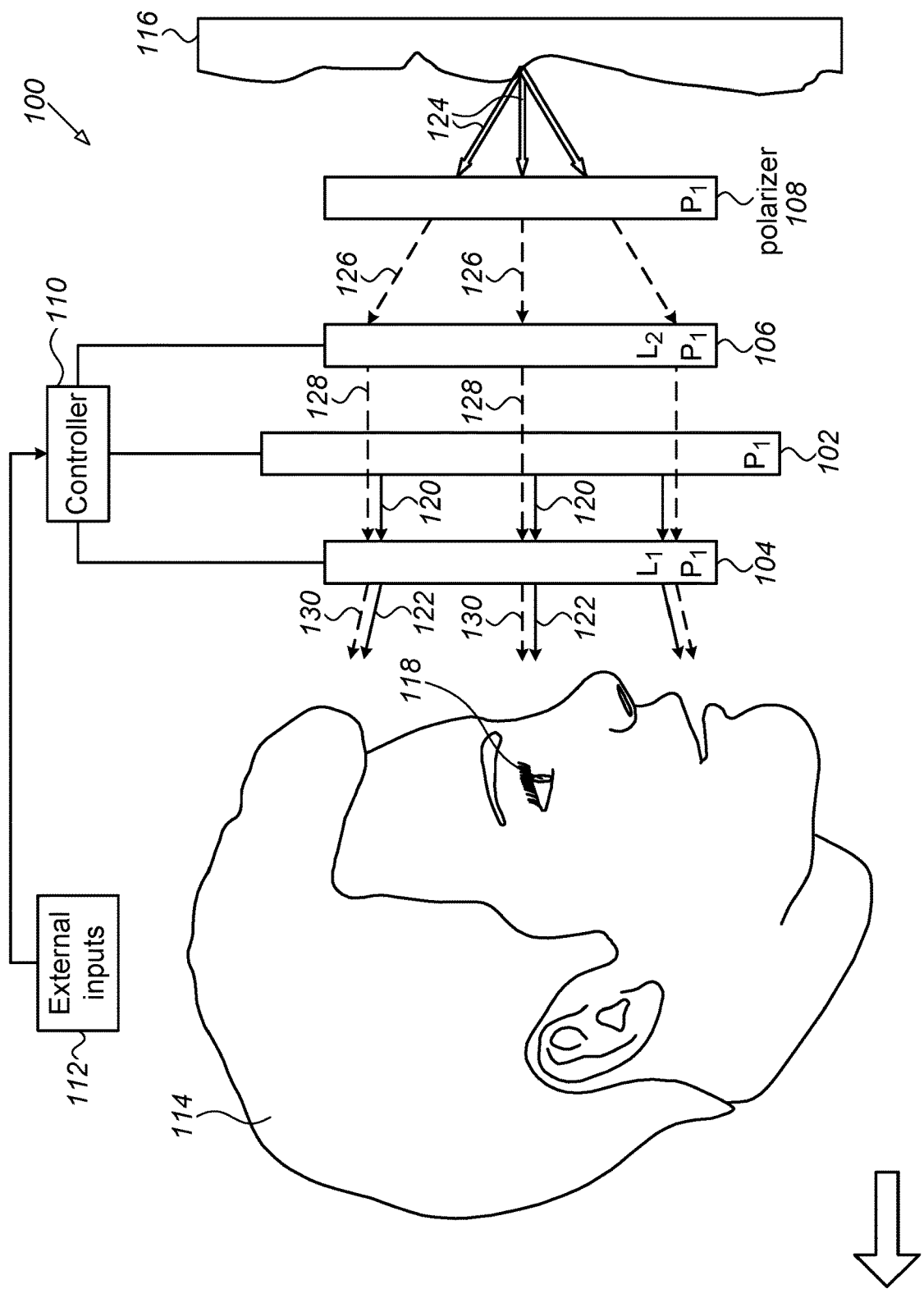
FIG. 3 is a schematic side view of an augmented reality system, in accordance with another embodiment of the invention.

FIG. 3 is a schematic side view of an AR system 100, in accordance with another embodiment of the invention.

AR system 100 comprises an AR projector 102, a first dynamic lens 104 ($L_1$), a second dynamic lens 106 ($L_2$), a polarizer 108, and a controller 110, with the AR projector and the dynamic lenses coupled to the controller. Controller 110 receives information from external inputs 112, similar to external inputs 79 to controller 78 in FIG. 2. AR projector 102 is similar to AR projector 72 of FIG. 1, but it emits polarized light at a polarization $P_1$. First and second dynamic lenses 104 and 106, respectively, have electrically controllable optical power at the polarization $P_1$ of AR projector 102, but are transparent and have no optical power at an orthogonal polarization $P_2$. This sort of performance is common, for example, in dynamic lenses based on liquid crystals. Polarizer 108 transmits light only at polarization $P_1$. Similarly to AR projector 72, AR projector 102 projects the image of a virtual scene towards a user 114. AR projector 102 is also transparent to light propagating from a real scene 116 towards an eye 118 of user 114, thus working in a see-through mode.

AR system 100 is similar to AR system 70 (FIG. 2), with the main difference being that AR projector 102 and dynamic lenses 104 and 106 work in polarized light, whereas the similar components in AR system 70 work in either polarized or unpolarized light. By virtue of the fact that polarizer 108 passes from real scene 116 only light polarized at $P_1$ polarization, AR system 100 from the polarizer onwards functions similarly to AR system 70. Although polarizer 108 in FIG. 3 is positioned farthest from user 114, it may be placed at any position in the optical path.

Denoting again the distance of the object of interest as $L_{SCENE}$, controller 110 focuses first dynamic lens 104 to optical power of $D_{L1}=-D_{USER}(D_{SCENE})$. First dynamic lens 104 receives collimated rays 120 emanating from AR projector 102 at polarization $P_1$ and refracts these rays according to its optical power $D_{L1}$ into diverging rays 122. (Both rays 120 and 122 are shown as solid lines.)

Rays 124, shown as double solid lines, emanate from real scene 116 with an arbitrary combination of polarizations $P_1$ and $P_2$, impinging on polarizer 108. Polarizer 108 passes only those of rays 124 that are polarized at $P_1$ as rays 126, which impinge on second dynamic lens 106. As in AR system 70, controller 110 focuses second dynamic lens 106 to a focal power of $D_{L2}=D_{SCENE}$, so that rays 126 are refracted by the second dynamic lens to collimated rays 128, and then by first dynamic lens 104 to rays 130 with the same divergence as rays 122. (Rays 126, 128, and 130 are shown as dashed lines.)

The examples described in the context of AR system 70 apply equally to AR system 100.

Figure 4:
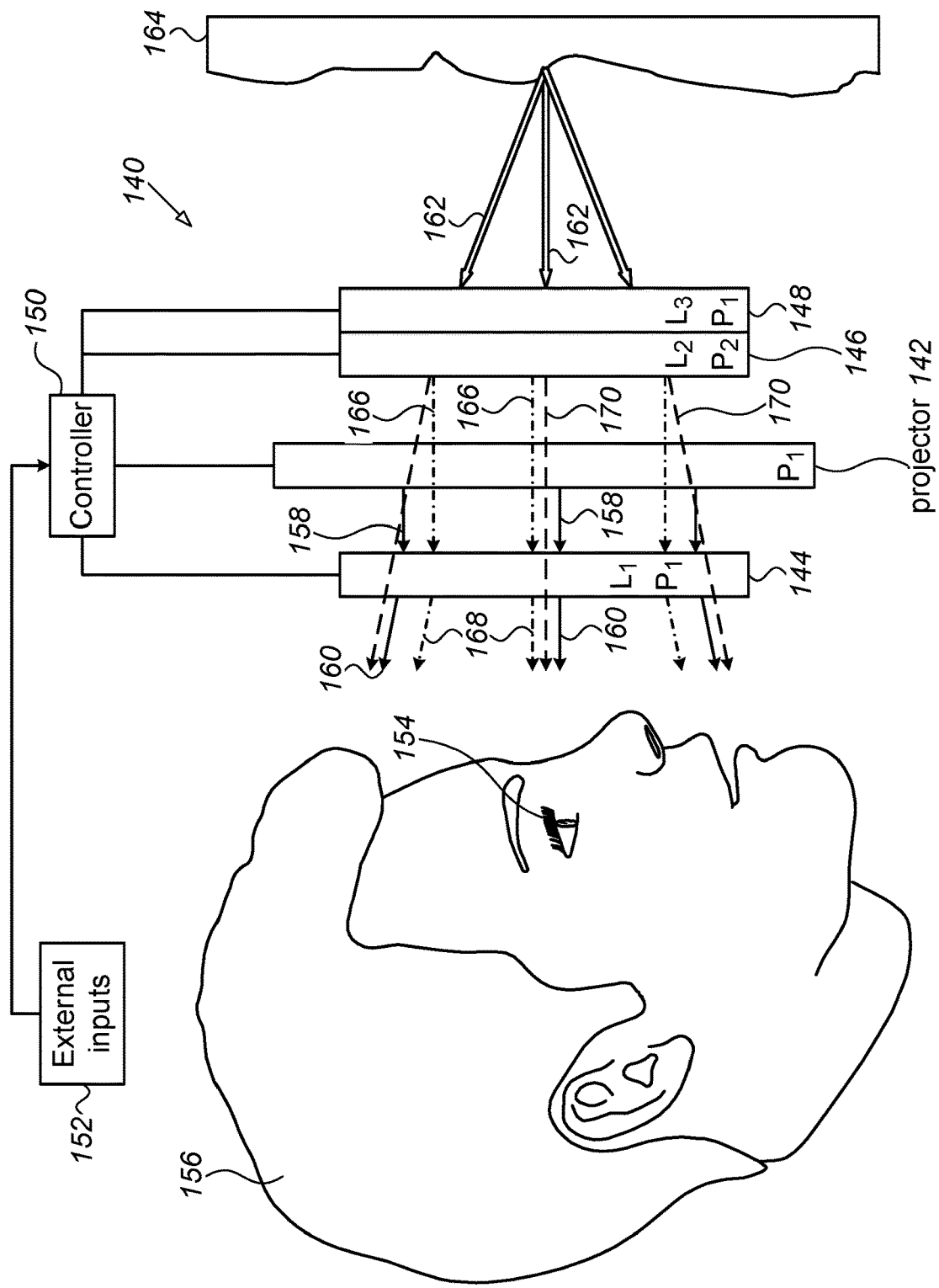
FIG. 4 is a schematic side view of an augmented reality system, in accordance with yet another embodiment of the invention.

FIG. 4 is a schematic side view of an AR system 140, in accordance with yet another embodiment of the invention.

AR system 140 comprises an AR projector 142, a first dynamic lens 144 ($L_1$), a second dynamic lens 146 ($L_2$), a third dynamic lens 148 ($L_3$), and a controller 150, with the AR projector and the dynamic lenses coupled to the controller. Controller 150 receives information from external inputs 152, similar to external inputs 79 to controller 78 in FIG. 2. AR projector 142 is similar to AR projector 102 of AR system 100 (FIG. 3), emitting polarized light at a polarization $P_1$.

First and third dynamic lenses 144 and 148, respectively, have electrically controllable optical power at polarization $P_1$, but have no optical power at an orthogonal polarization $P_2$, whereas second dynamic lens 146 has electrically controllable optical power at polarization $P_2$, but none at $P_1$.

Similarly to VR system 20, controller 150 focuses first dynamic lens 144 to optical power of $D_{L1}=-D_{USER}(D_{SCENE})$ in order to cancel the accommodation $D_{USER}(D_{SCENE})$ of an eye 154 of an user 156, enabling sharp vision of a virtual object positioned at a distance $L_{SCENE}(=1/D_{SCENE})$ from the user. First dynamic lens 144 receives parallel rays 158 emanating from AR projector 142 and refracts them according to its optical power $D_{L1}$ into diverging rays 160. (Both rays 158 and 160 are shown as solid lines.)

Controller 150 focuses second and third dynamic lenses 146 and 148, respectively, as follows: second dynamic lens 146 is focused to $D_{L2}=D_{SCENE}+D_{L1}=D_{SCENE}-D_{USER}(D_{SCENE})$, and third dynamic lens 148 is focused to $D_{L3}=D_{SCENE}$.

Light rays 162, shown as double solid lines, emanate from a real object in scene 164 with an arbitrary combination of polarizations $P_1$ and $P_2$, impinging on third dynamic lens 148. Third dynamic lens 148 refracts the $P_1$-polarized rays of rays 162 to collimated rays 166, shown as dot-dashed lines, and passes the $P_2$-polarized rays unrefracted to second dynamic lens 146. Rays 166 are refracted by first dynamic lens 144 into diverging rays 168 (dot-dashed lines) similarly to rays 160. Thus first and third dynamic lenses 144 and 148, respectively, together with AR projector 142, function similarly to the dynamic lenses of AR system 100 (FIG. 3).

Those of rays 162 that are polarized at $P_2$ are refracted by second dynamic lens 146 into rays 170, shown as dashed lines. As these rays are not refracted by first dynamic lens 144, they enter eye 154 with a divergence that has been determined by the optical power $D_{L2}$ of second dynamic lens 146 in such a way that the eye perceives both rays 168 and 170 at polarizations $P_1$ and $P_2$, respectively, as emerging from real object in scene 164 at the same distance.

Since the divergence of rays 160 is also matched to the distance of real scene 164, eye 154 sees both the virtual image projected by AR projector 142 and the real object at the same distance in a sharp focus.

As an example, consider real object in scene 164 at a distance of $L_{SCENE}=33\frac{1}{3}$ cm, corresponding to $D_{SCENE}=3$ diopters. Consider also eye 154 that is accommodated to +1 diopters, i.e., $D_{USER}(D_{SCENE})=1$ diopter. Consequently, controller 150 focuses first dynamic lens 144 to $D_{L1}=-1$ diopter, and third dynamic lens 148 to $D_{L3}=+3$ diopters. Controller 150 also focuses second dynamic lens 146 to an optical power (in diopters) of:

$$D_{L2}=D_{SCENE}-D_{USER}(D_{SCENE})=3-1=2.$$

Based on these given optical powers of dynamic lenses 144, 146, and 148, the virtual scene projected by AR projector 142 and rays from real scene 164 in both polarizations $P_1$ and $P_2$ are all seen sharply by eye 154 with a power of accommodation of +1 diopter.

Second dynamic lens 146 may alternatively be positioned anywhere in the optical path of the system, for example between user 156 and AR projector 142.

Figure 5:
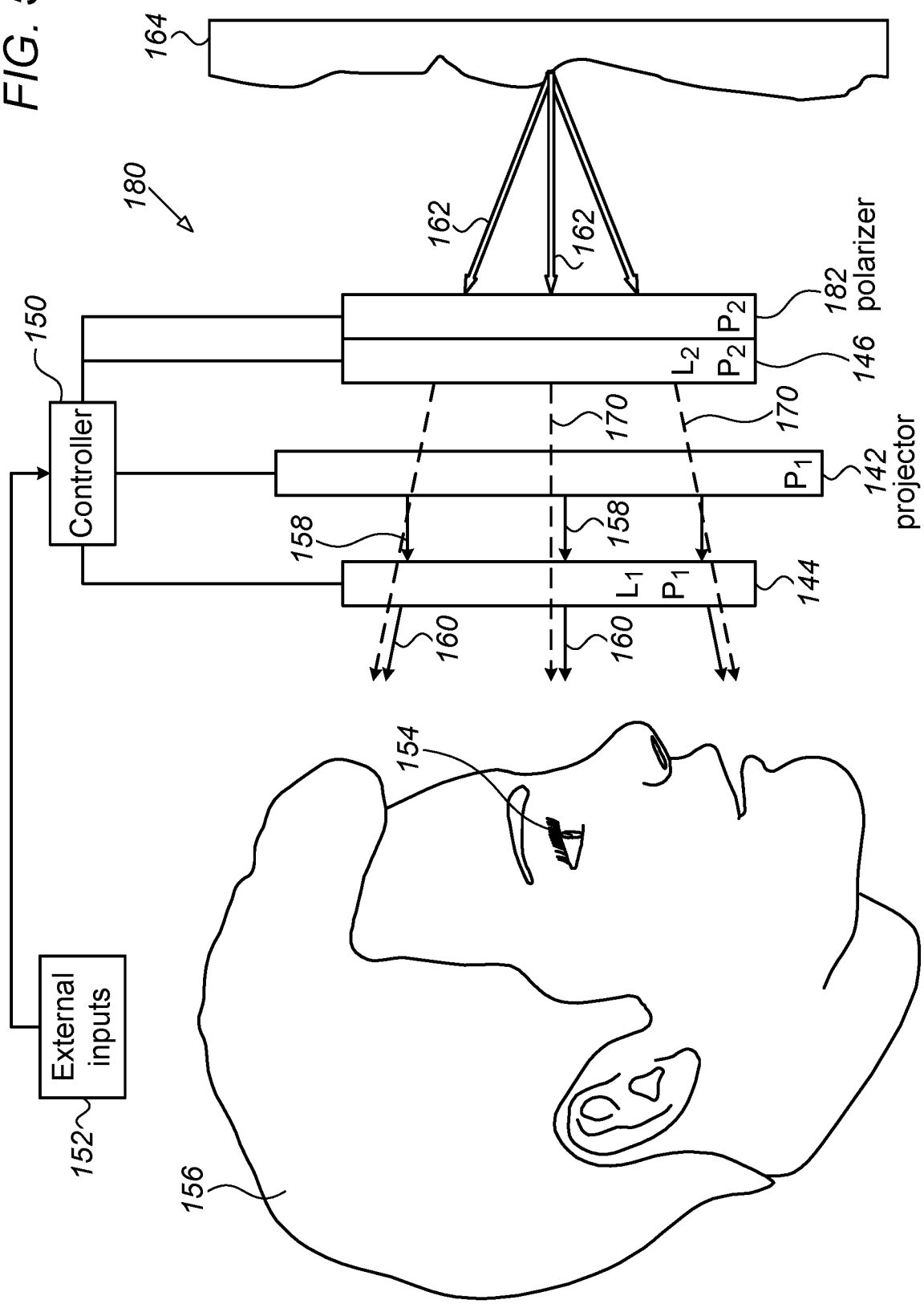
FIG. 5 is a schematic side view of an augmented reality system, in accordance with still another embodiment of the invention.

FIG. 5 is a schematic side view of an AR system 180, in accordance with still another embodiment of the invention.

AR system 180 is similar to AR system 140 (FIG. 4), but with third dynamic lens 148 of AR system 140 being replaced by a polarizer 182. Polarizer 182 passes only light polarized at $P_2$. Due to the similarity between AR systems 140 and 180, the same numerical labels are used for similar or identical items.

As polarizer 182 blocks those of rays 162 that have polarization $P_1$, rays 166 and 168 that were present in AR system 140 have been removed. Thus, eye 154 sees $P_1$-polarized rays 160 from AR projector 142 and $P_2$-polarized rays 170 from real scene 164, both in sharp focus.

As in AR system 140, second dynamic lens 146 may alternatively be positioned anywhere in the optical path of the system, for example between user 156 and AR projector 142.

Figure 6:
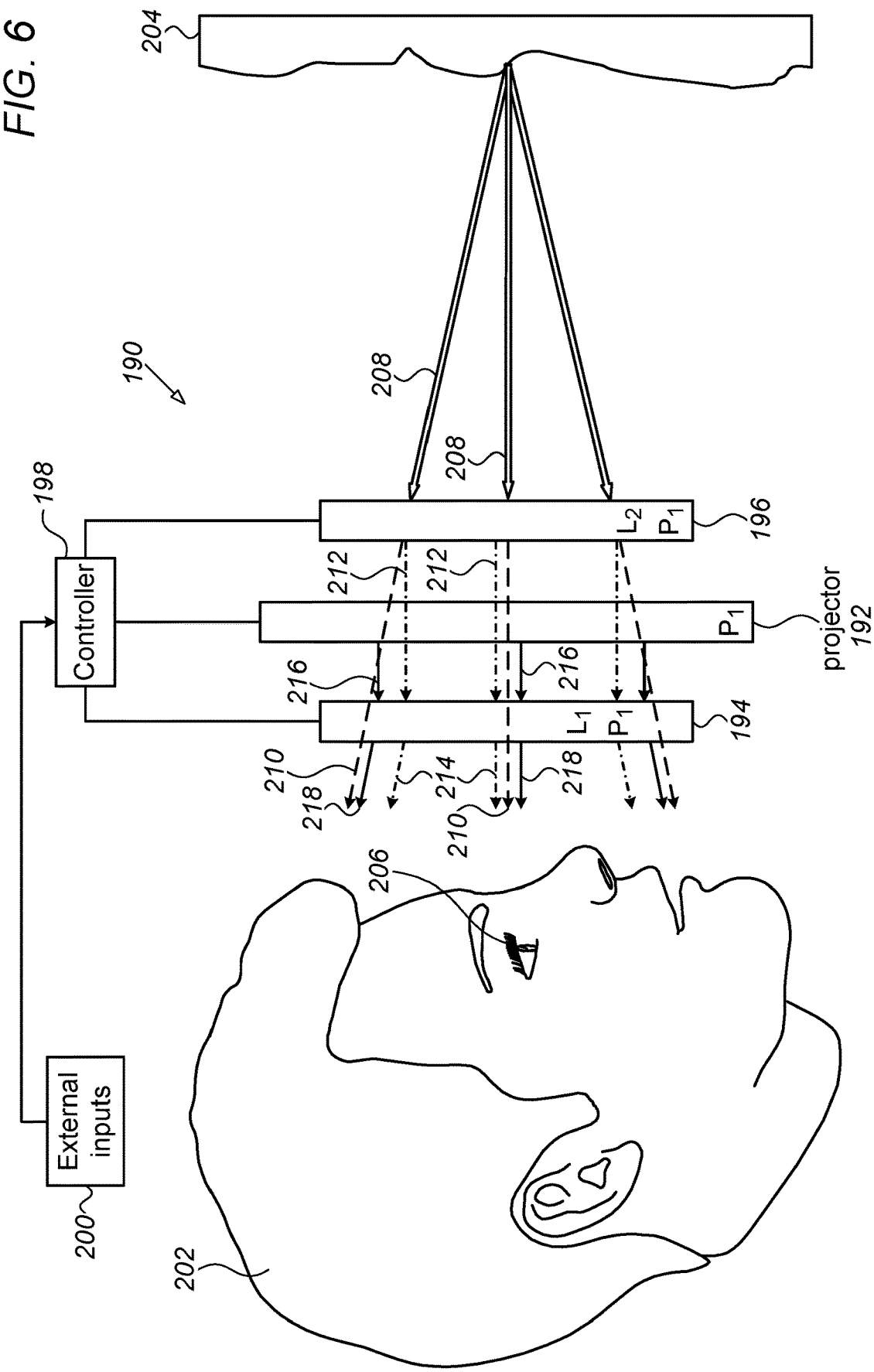
FIG. 6 is a schematic side view of an augmented reality system, in accordance with a further embodiment of the invention.

FIG. 6 is a schematic side view of an AR system 190, in accordance with a further embodiment of the invention.

AR system 190 comprises an AR projector 192, first and second dynamic lenses 194 ($L_1$) and 196 ($L_2$), respectively, and a controller 198, with the AR projector and the dynamic lenses coupled to the controller. Controller 198 receives information from external inputs 200, similar to external inputs 79 to controller 78 in FIG. 2.

AR projector 192, similar to AR projector 102 of FIG. 3, emits polarized light at polarization $P_1$. Both dynamic lenses 194 and 196 have electrically adjustable optical power at polarization $P_1$, but have no optical power at an orthogonal polarization $P_2$. Similarly to AR projector 72, AR projector 192 projects the image of a virtual object towards a user 202. AR projector 192 is also transparent to light propagating from a real scene 204 towards an eye 206 of user 202, thus working in a see-through mode.

Light rays 208, shown as double solid lines, emanate from a real object in scene 204 at an arbitrary combination of polarizations $P_1$ and $P_2$, impinging on second dynamic lens 196. Due to the property of second dynamic lens 196 that it possesses optical power only at polarization $P_1$, rays 208 are split into orthogonally polarized rays, rays 210 polarized at polarization $P_2$ and rays 212 polarized at $P_1$. Rays 210, shown as dashed lines, pass through second dynamic lens 196 without refraction (ignoring the slight refraction by the plane parallel slab of the second dynamic lens), and continue similarly without refraction through AR projector 192 and first dynamic lens 194 to eye 206. Controller 198 focuses second dynamic lens 196 so that real scene 204 is at its focal plane. Rays 212, shown as dot-dashed lines, are refracted by second dynamic lens 196 to collimated rays, pass through AR projector 192, and are refracted by first dynamic lens 194 into rays 214, shown again as dot-dashed lines.

Since rays 210, polarized at $P_2$, do not experience any refraction, real scene 204 is seen in a sharp focus by user 202 only if eye 206 can accommodate for the distance $L_{SCENE}$ of real scene 204. Consequently, controller 198 focuses first dynamic lens 194 to an optical power of $D_{L1}=-D_{SCENE}$, where $D_{SCENE}=1/L_{SCENE}$. Rays 216, emanating from AR projector 192 as collimated rays, are refracted to rays 218 by first dynamic lens 194. Both rays 218 and 214 (shown as solid lines), refracted by first dynamic lens 194, as well as unrefracted rays 210, enter eye 206 with a divergence corresponding to the distance $L_{SCENE}$ of real object of interest in scene 204. Thus, user 202 sees both the virtual image and real objects at the distance of interest in sharp focus, as long as the user is capable of accommodating for the distance $L_{SCENE}$.

Although AR system 190 may not suit a user suffering from presbyopia, it alleviates, as a monocular system, the virtual-real focus conflict for a user with full power of accommodation. In addition, when a pair of AR systems 190 is assembled into a binocular system, it alleviates both the vergence-accommodation and virtual-real focus conflicts for a user with full power of accommodation. AR system 190 is similar to AR system 100 (FIG. 3), but does not require a polarizer, thus requiring less hardware and avoiding attenuating the light from the real world reaching the user.

As an overview, the VR and AR systems shown in FIGS. 1-6 and the polarization of their components are summarized in Table 2, below.

TABLE 2

Summary of VR and AR systems

| VR or AR system | FIG. | Pol. of VR or AR projector | Pol. of 1$^{st}$ dynamic lens | Pol. of 2$^{nd}$ dynamic lens | Pol. of 3$^{rd}$ dynamic lens | Polarizer (pass) |
|---|---|---|---|---|---|---|
| 20 | 1 | unpol. | unpol. | no lens | no lens | no pol. |
| 70 | 2 | unpol. | unpol. | unpol. | no lens | no pol. |
| 100 | 3 | $P_1$ | $P_1$ | $P_1$ | no lens | $P_1$ |
| 140 | 4 | $P_1$ | $P_1$ | $P_2$ | $P_1$ | no pol. |
| 180 | 5 | $P_1$ | $P_1$ | $P_2$ | no lens | $P_2$ |
| 190 | 6 | $P_1$ | $P_1$ | $P_1$ | no lens | no pol. |

Compound Dynamic Lenses Utilizing Static Offset Lenses

The optical quality of pixelated dynamic lenses, such as those described in the above-mentioned PCT patent application PCT/IB2013/058989, degrades with increasing optical power (absolute value of the optical power), especially in the periphery of the lens.

Some embodiments of the present invention that are described herein provide optical designs to mitigate these problems using compound dynamic lenses, wherein a conventional (static) plastic or glass lens is combined with a dynamic lens in order to shift its range of operation. The disclosed embodiments shift the range of operation of the dynamic lens, in diopters, by the optical power of the added static lens.

Compound dynamic lenses of this sort can be used in VR systems and AR systems shown in FIGS. 1-6. As summarized in Table 3, below, these systems include a first dynamic lens that is always configured to a variable non-positive optical power (including zero). Where a second dynamic lens is included, it is always configured to a variable non-negative optical power (including zero). Consequently, the use of compound dynamic lenses enables configuring the ranges of the dynamic lenses themselves around zero optical power, thus reducing their maximal (absolute value) optical power.

TABLE 3

Dynamic lenses by labels in FIGS. 1-6

| | First dynamic lens, optical power always ≤0 | Second (and third) dynamic lens, optical power always ≥0 |
|---|---|---|
| FIG. 1 | 28, 30 | — |
| FIG. 2 | 74 | 76 |
| FIG. 3 | 104 | 106 |
| FIG. 4 | 144 | 146, 148 |
| FIG. 5 | 144 | 146 |
| FIG. 6 | 194 | 196 |

Figure 7A:
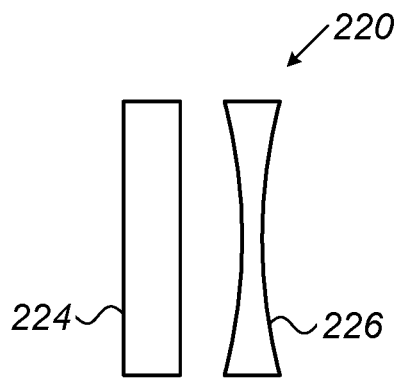
FIGS. 7A-B are schematic cross-sections of two compound dynamic lenses, in accordance with an embodiment of the invention.
Figure 7B:
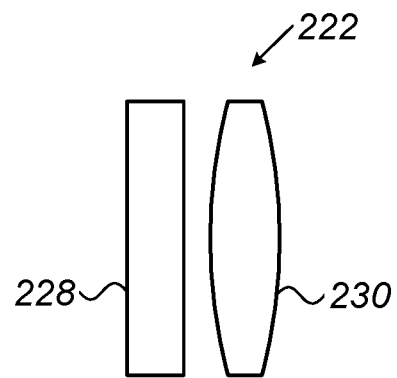

FIGS. 7A-B are schematic cross-sections of compound dynamic lenses 220 and 222, respectively, in accordance with embodiments of the invention.

FIG. 7A shows compound dynamic lens 220 comprising a dynamic lens 224 and a static negative lens 226. Dynamic lens 224 and static negative lens 226 are positioned in close proximity to each other, possibly in contact with each other, with their optical apertures mutually aligned. According to a thin-lens approximation, the sum of the optical powers of dynamic lens 224 and a static negative lens 226 makes up the optical power of compound dynamic lens 220. Consequently, varying the optical power of dynamic lens 224 enables varying the optical power of compound dynamic lens 220. Lens 226 can be a plano-concave lens, where the planar side of the lens is attached to dynamic lens 224.

For example, for a compound dynamic lens 220 that is required to work in the range from −2 to 0 diopters, static lens 226 with an optical power of −1 diopter is brought into contact with or close proximity to dynamic lens 224. For achieving a range of total optical power of −2 to 0 diopters, dynamic lens 224 is now operated in a range of −1 to +1 diopters, thus achieving the required power range of −2 to 0 diopters, but with a better optical performance than with a single dynamic lens working in the range of −2 to 0 diopters.

FIG. 7B shows compound dynamic lens 222 comprising a dynamic lens 228 and a static positive lens 230. Similarly to compound dynamic lens 220 (FIG. 7A), dynamic lens 228 and static positive lens 230 are positioned in close proximity to each other, possibly in contact with each other, with their optical apertures mutually aligned. Similarly to compound dynamic lens 220, the sum of the optical powers of the dynamic lens and the static positive lens makes up the optical power of compound dynamic lens 222. Varying the optical power of dynamic lens 228 enables varying the optical power of compound dynamic lens 222. Lens 222 can be a plano-convex lens, where the planar side of the lens is attached to dynamic lens 228.

For example, for a compound dynamic lens 222 that is required to work in the range from 0 to +2 diopters, static lens 230 with an optical power of +1 diopter is brought into contact with or close proximity to dynamic lens 228. For achieving a total optical power range of 0 to +2 diopters, dynamic lens 228 is operated in a range of −1 to +1 diopters, thus achieving the required power range of 0 to +2 diopters, but with a better optical performance than with a single dynamic lens working in the range of 0 to +2 diopters.

When dynamic lenses are implemented using pixelated Fresnel-lenses as described in the abovementioned PCT application, there is a difference in the quality of optical performance between positive and negative lenses. While both positive and negative lenses cause some light scattering from the modulation jumps of the Fresnel-lens structure, negative lenses scatter light toward the pupil of the eye of the observer while positive lenses scatter light away from the pupil. This scattering is due to the fact that the abrupt phase transitions in a Fresnel-lens are not ideal but have finite width. The fast phase modulation across this finite width acts as a prism, scattering light inwards for a negative lens and outwards for a positive lens. When viewing a projected virtual image or a real scene with a high contrast through a dynamic lens, this scattering leads to significantly more light smearing when the lens is configured for negative power.

Therefore in some cases it may be beneficial to shift the dynamic operation range further or completely towards the positive power range, by using a static negative lens, as shown in FIG. 7A, together with a dynamic lens that is electrically tuned over a range of positive optical powers (and possibly a limited negative optical power range, as well). For example, a compound dynamic lens requiring a dynamic range from −2 to 0 diopters can be implemented using a static lens set to the negative extreme of the dynamic range, with an optical power of −2 diopters, combined with a dynamic lens operated between 0 and +2 diopters. Alternatively, the static lens may simply be set closer to the negative extreme than to the positive extreme of the dynamic range. For example, the static lens may have an optical power of −1.5 diopters with a dynamic lens operated between −0.5 and +1.5 diopters, provided that the scattering from the dynamic lens at −0.5 diopter is acceptable.

Improved Dynamic Fresnel-Lens

The electrically-tunable liquid crystal lenses that are described in the above-mentioned PCT patent application PCT/IB2013/058989 have a range of phase modulation that is limited by the birefringence of the liquid crystal material and the thickness of the liquid crystal layer. (The maximal modulation is equal to the product of the birefringence and the layer thickness.) In order to increase the dynamic range of the achievable optical power and aperture size, such lenses can be operated as a Fresnel-lens, with concentric zones of a radially sloping phase profile and sharp phase jumps between the zones.

Such Fresnel-lenses, when implemented with a large aperture, can suffer from excessive scattering from the outer zones of the lens. Reducing the aperture of the lens reduces scattering but distorts the field of view due to the abrupt edge of the aperture, as well as due to a lack of optical power on the line-of-sight between the observer's eye and a virtual object in the periphery of the field of view.

Some embodiments of the present invention provide an improved dynamic lens to mitigate these problems. These embodiments are based on:
a) electronically shifting the area of best optical performance of the lens dynamically to the line-of-sight of the user, and
b) designing the lens for high image quality and low scatter.

Figure 8:
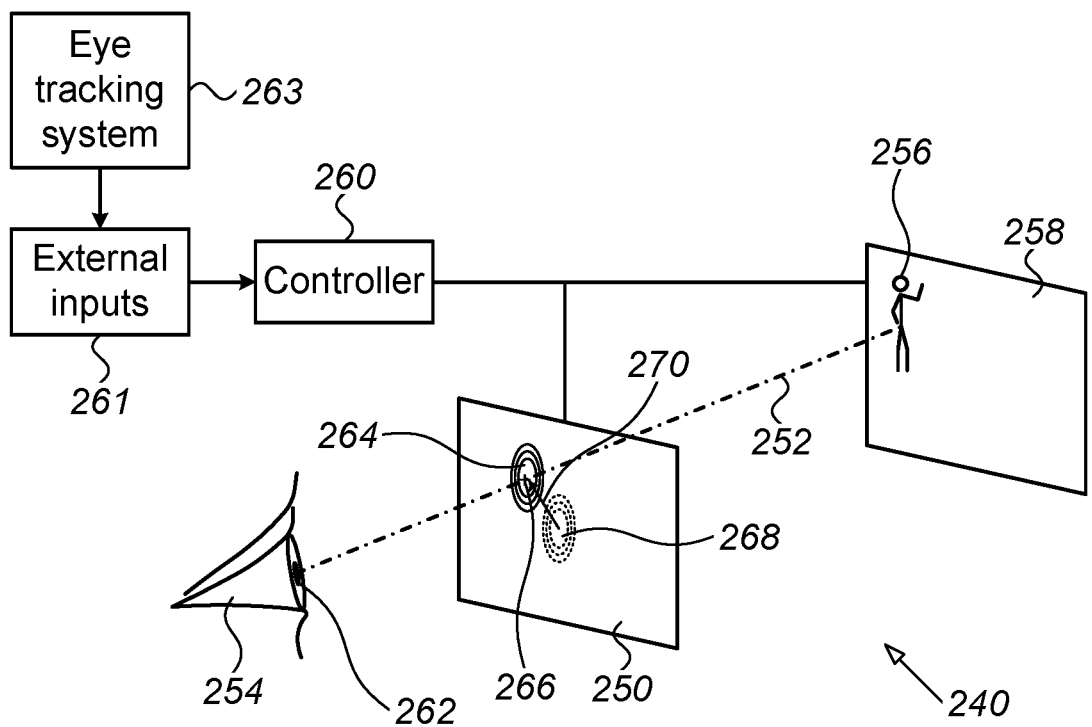
FIG. 8 is a schematic pictorial illustration of a virtual reality system with a dynamic lens centered around a line-of-sight, in accordance with an embodiment of the invention.
Figure 9A:
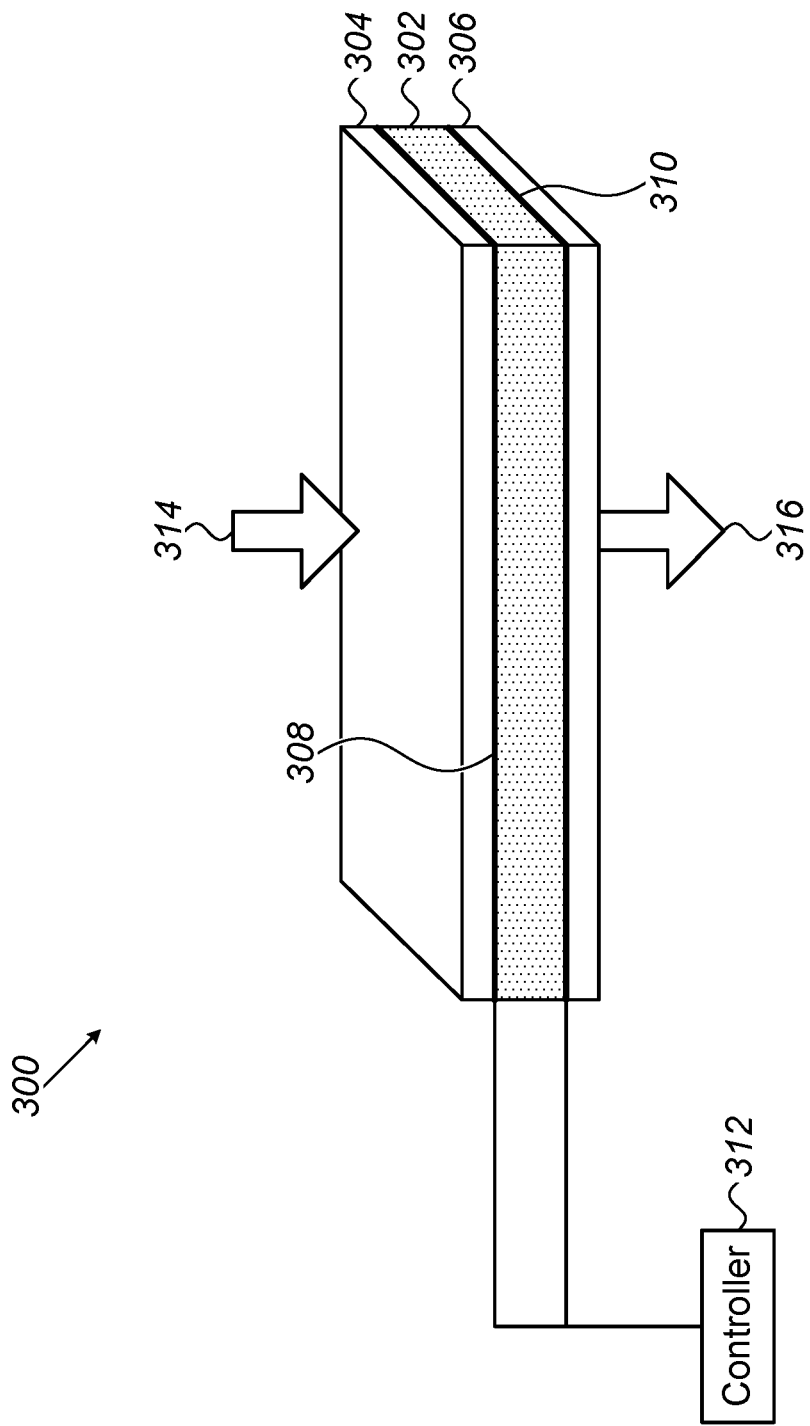

FIG. 8 shows a VR system 240 with a dynamic lens 250 whose optical center (i.e., the location of the optical axis of the dynamic lens) is adaptively centered around a line-of-sight 252, in accordance with an embodiment of the invention.

An eye 254 observes a virtual object 256 in a virtual scene 258. A controller 260 controls dynamic lens 250 and virtual scene 258. Line-of-sight 252 is a straight line connecting a center of a pupil 262 of eye 254 to object 256. Controller 260 determines the direction and position of line-of-sight 252 based on the image content of virtual scene 258. In an alternative embodiment, controller 260 determines the direction and position from external inputs 261 based on, for example, eye tracking information from an eye tracking system 263. Controller 260 finds the point of intersection 266 between line-of-sight 252 and dynamic lens 250, and drives the dynamic lens in such a way that its optical center area 264 (area of best optical performance) shifts to the point of intersection from a previous location 268, as shown by an arrow 270. This shift ensures that the fovea (not shown) of eye 254 receives an image of object 256 based on light that has traveled through optical center area 264 of dynamic lens 250.

In an alternative embodiment, system 240 is an AR system, in which case virtual object 256 and virtual scene 258 may be replaced, respectively, by a real object and a real scene.

FIGS. 9A-E schematically show a design of a modified dynamic Fresnel-lens 300, in accordance with an embodiment of the invention. As shown in the schematic, pictorial view of FIG. 9A, lens 300 comprises an electro-optical layer 302, comprising a liquid crystal, for example, and having an effective local index of refraction at any given location within the active area of the electro-optical layer that is determined by a voltage waveform applied across the electro-optical layer at the location. Electro-optical layer 302 is sandwiched between two transparent substrates 304 and 306, such as glass plates. Conductive electrodes 308 and 310 are formed on substrates 304 and 306, typically on the inner sides of the substrates, and are thus disposed over both sides of the electro-optical layer. Incident light 314 impinges on lens 300, which modifies the optical phase of transmitted light 316.

Electrodes 308 and 310 may define a grid pattern, which is capable of applying the voltage waveforms in a two-dimensional pattern, thus generating the Fresnel-lens in a single electro-optical layer. A grid pattern can be implemented if electrodes 308 and 310 comprise parallel conductive stripes, oriented in orthogonal directions. Alternatively, the electrodes may comprise parallel conductive stripes on one side (for example, electrodes 308), and a single common electrode (for example, electrode 310) spanning the entire panel on the opposite side. In this case, lens 300 can be used to generate a cylindrical Fresnel lens, and two such lenses, with stripe electrodes running in mutually orthogonal directions, can be used together to generate the sorts of two-dimensional Fresnel patterns that are shown here.

In either case, a controller 312 applies respective control voltage waveforms to the excitation electrodes so as to generate a specified modified Fresnel profile in lens 300, as described below. This modified Fresnel design includes a central zone with a parabolic optical phase profile (as in a conventional Fresnel-lens), surrounded by one or more annular zones with smoothly-varying optical phase in order to ensure that the eye sees a smooth image. Each zone typically includes several periods of the Fresnel-patterns, and the term "smoothly varying" means that there are no discontinuities in the optical phase other than the jumps of 2π (and integer multiples thereof) that are characteristic of Fresnel optics. The controller can change the location of the central zone, together with the surrounding annular zones, in response to changes in the user's direction of gaze, as explained above. Although the specific design shown in FIGS. 9B-9E includes three such annular zones, in alternative embodiments (not shown in the figures), the controller may generate one, two, or more annular zones around the central zones.

FIG. 9B shows a schematic top view of modified dynamic lens 300, which is based on a modified Fresnel-design that combines high image quality and low scatter. Controller 312 applies respective control voltages to the excitation electrodes of lens 300 in order to generate the desired phase profiles of the various Fresnel-patterns further detailed below. The circular zones shown in FIG. 9B can be approximated, for example, by electrodes 308 and 310 arranged a grid pattern. Alternatively, the pattern of zones may be rectangular or have some other suitable shape. (Further alternatively, when two orthogonal cylindrical dynamic lenses are used together, each lens can generate zones in the form of vertical or horizontal bands, which approximate a pattern of rectangular zones when overlaid. In such a case the zones are separable in the horizontal and vertical directions, such that each area in the pattern corresponds to the overlap of one zone in the horizontal direction with another zone in the vertical direction.)

Although the description below relates specifically, for the sake of clarity, to the case of circular zones, the principles of this embodiment are similarly applicable, mutatis mutandis, to rectangular and other shapes; and references to a radial coordinate in the description and the claims should be understood simply to mean the distance from the center of the pattern. Although FIGS. 9C-9E show the invention in one dimension, they can be extended to two dimensions as described above.

Dynamic lens 300 comprises four concentric zones: a circular area forming optical center area 264 (with reference to FIG. 8), a first annular zone forming a transition area 322, a second annular zone forming a prismatic area 324, and a third annular zone forming an outer area 326. Optical center area 264 is designed as a high-quality Fresnel-lens with a parabolic optical phase in order to ensure a sharp image around the fovea of eye 254 (FIG. 8). In transition area 322 the optical power of the Fresnel-type design decreases gradually with increasing distance from the center, such that the radial second derivative of the phase varies continuously over area 322. In prismatic area 324 the design is that of a Fresnel-prism, with a constant slope of the optical phase of the prism. (By the slope of the optical phase we mean a radial derivative of the optical phase with respect to a radial coordinate.) Transition area 322 is designed so that the slope of the optical phase of dynamic lens 300 is continuous from optical center area 264 all the way through prismatic area 324. In outer area 326 the optical phase is constant.

The design described above ensures that, in addition to high-quality imaging by optical center area 264, the total area of the active aperture with Fresnel-type profiles (comprising optical center area 264, transition area 322, and prismatic area 324) is limited in order to limit the amount of optical scattering from the phase discontinuities. Due to the continuous slope of the optical phase, discontinuities of the image of object 256 (FIG. 8) on the retina of eye 254 are avoided. The transition from prismatic area 324 to constant phase area 326 is abrupt in this example. In other embodiments this transition can be gradual, continuously decreasing the slope of the phase modulation profile.

Limiting the active aperture of dynamic lens 300 in the manner described above also reduces its power consumption, and enables the use of thinner electro-optical layers (with a smaller range of dynamic phase modulation), resulting in a faster switching time. The active aperture can be limited by simply "turning off" dynamic lens 300 outside of the active aperture.

An example of the dimensions of radial zones 264, 322, 324, and 326 of dynamic lens 300 are shown in FIG. 9B by using a horizontal X-coordinate axis 328. With centers of radial zones 264, 322, 324, and 326 located at an origin 330 of X-coordinate axis 328, the radial sizes of the radial zones are marked on the axis. Optical center area 264 extends from −4 mm to +4 mm, having thus an aperture diameter of 8 mm. Transition area 322 extends a radial distance of 3 mm from optical center area 264, ending at ±7 mm on X-coordinate axis 328. Prismatic area 324 extends a further 3 mm, ending at ±10 mm on X-coordinate axis 328. Outer area 326 extends 5 mm outside prismatic area 324, ending at ±15 mm on X-coordinate axis 328.

For clarity of illustration in FIGS. 9B-E, dynamic lens 300 is shown to be only slightly larger than the outer circumference of outer area 326. In practical embodiments, however, dynamic lens 300 may be substantially larger (for example, 60 mm×60 mm or 100 mm×100 mm) than radial zones 264, 322, 324, and 326, in order to enable centering optical center area 264 around line-of-sight 252, as described above. The dimensions in FIG. 9B are shown only as an example, and other dimensions, either larger or smaller, may be used in alternative embodiments. Dynamic lens 300 may be rectangular, square, or any other suitable shape.

FIGS. 9C-E are plots showing respective curves 334, 336, and 338 of the properties of dynamic lens 300 from −15 mm to +15 mm along X-coordinate axis 328 of FIG. 9B. Curves 334, 336, and 338 are aligned with X-coordinate axis 328 of FIG. 9B, as shown by dashed lines 340. Further dashed lines 342 are drawn from FIG. 9B to FIGS. 9C-E to help relating the figures to each other.

Curve 334 shows an optical phase from 0 radians to 40 radians. Within ±4 mm the optical phase variation is parabolic for high-quality imaging, with phase discontinuities of approximately 40 radians, typical to a Fresnel-design. From ±4 mm to ±7 mm (transition area 322) the optical phase variation gradually changes from parabolic to linear, until from ±7 mm to ±10 mm (prismatic area 324) it is entirely linear. From ±10 mm to ±15 mm (outer area 326) the optical phase is zero.

Curve 336 shows an optical power in diopters (D) from 0 D to 2 D. Within ±4 mm (optical center area 264), the optical power is 2 D. From ±4 mm to ±7 mm (transition area 322), the optical power falls gradually from 2 D to 0 D. From ±7 mm to ±10 mm (prismatic area 324) and from ±10 mm to ±15 mm (outer area 326), the optical power is zero.

Curve 338 shows a slope (radial derivative) of the optical phase in arbitrary units. Within ±4 mm (optical center area 264) the slope is linear, consistent with the parabolic phase of optical center area 264. From ±4 mm to ±7 mm (transition area 322) the slope gradually and continuously levels off, until from ±7 mm to ±10 mm (prismatic area 324) the slope is constant, consistent with a prismatic phase. At ±10 mm slope drops to zero, continuing as zero from ±10 mm to ±15 mm (outer area 326). Due to the smooth and continuous behavior of the slope across radial zones 264, 322, and 324, discontinuities of the image of object 256 on the retina of eye 254 are reduced or completely avoided.

The numerical values represented by curves 334, 336, and 338, are given as examples only, and other values may be used in alternative embodiments.

Dynamic Compensation of a Virtual Scene

In VR and AR systems, wherein a dynamic lens is utilized for viewing the virtual scene, a change in the configuration of the dynamic lens may change the perception of the user of the virtual scene due to a change of the aberrations of the dynamic lens, such as a change of the magnification or the distortion, or a change of prismatic or chromatic effects. In addition, non-ideal optical performance of the dynamic lens may change the quality of the imaged virtual scene.

Some embodiments of the present invention, as described below, mitigate these problems by digitally modifying the virtual scene in response to the configuration of the dynamic lens.

Figure 10:
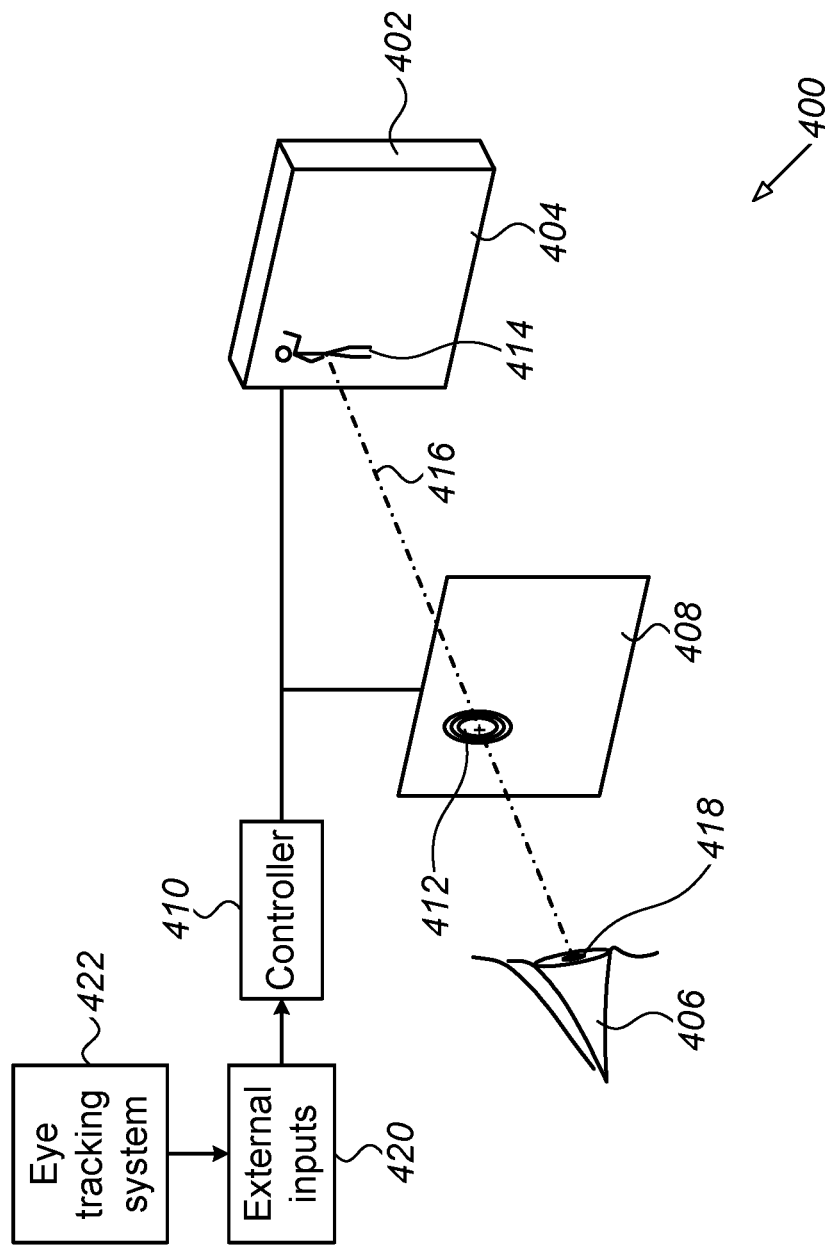
FIG. 10 is a schematic pictorial illustration of a virtual reality system, in accordance with other embodiments of the invention.

FIG. 10 shows schematically a system 400, in accordance with embodiments of the invention. System 400, which is either a VR system or a part of an AR system, comprises a projector 402 projecting an image of a virtual scene 404 towards an eye 406. Eye 406 views virtual scene through a dynamic lens 408, which is positioned between the eye and the virtual scene. A controller 410 is coupled to control both projector 402 and dynamic lens 408. Since controller 410 controls digitally both the image content of virtual scene 404 and dynamic lens 408, it can be configured to modify digitally the image content of the virtual scene in response to changes in the configuration of the dynamic lens. Similarly to FIGS. 8 and 9A-D, dynamic lens 408 can be configured to have an optical center area 412, which provides for high-quality imaging of a virtual object 414 to eye 406 by bringing optical center area 412 to be centered on a line-of-sight 416, connecting a pupil 418 of eye 406 and the virtual object. Controller 410 determines the direction and position of line-of-sight 416 based on the image content of virtual scene 404. In an alternative embodiment, controller 410 determines the direction and position from external inputs 420 based on, for example, eye tracking information from an eye tracking system 422.

Magnification

In general, placing a lens in front of a person's eye slightly changes the magnification of the image on the retina. Objects look slightly larger when viewed through a positive lens, and slightly smaller through a negative lens.

Referring to FIG. 10, in system 400 dynamic lens 408 is typically configured for a negative optical power (negative focal length). Consequently virtual object 414 will seem smaller to eye 406 than its actual size. As the magnification of virtual object changes due to the negative power dynamic lens 408, it may cause a perceivable mismatch between the dimensions of virtual scene 404 and the real scene of the AR system. This mismatch also varies when the optical power of dynamic lens 408 is changed to enable a sharper view. Consequently, the user might sense that virtual object 414 shrinks or expands, leading to a unnatural and less immersive experience.

In the present embodiment, controller 410 modifies the image content of virtual scene 404 to compensate for this mismatch. For example, when virtual object 414 is displayed at a distance of 50 cm, dynamic lens 408 is configured for a power of −2 diopters. In generating the image content of virtual scene 404, controller 410 changes the magnification of the image content so as to compensate for the change in magnification due to the −2 diopter power of dynamic lens 408.

The magnification resulting from the optical power of dynamic lens 408 can be approximated using the calculation below. For simplicity, a small angle approximation is used in these calculations ($\sin(x) \approx x$).

A light ray reaching eye 406 at angle c relative to the optical axis of the eye passes through dynamic lens 408 at a distance of approximately $dx=d*\alpha$ from the center of the dynamic lens, where d is the distance between the dynamic lens and pupil 418. Rays passing through dynamic lens 408 experience a prismatic effect, where the rays are refracted by an angle $\Delta\alpha=dx/f$, where dx is the distance between the center of the lens and the position where the rays cross the lens, and f is the focal length of the dynamic lens.

Therefore, the magnification is given by $\Delta\alpha/\alpha=d/f$. For example, if dynamic lens 408 is located 20 mm from pupil 418, and its optical power is 2 diopters (f=500 mm), the magnification is 20/500=4%, or 1.04.

Local Distortion

Referring again to FIG. 10, virtual scene 404 in system 400 may subtend a wide field of view, such as ±30° or even larger. However, only a small part of virtual scene 404 is seen with high resolution by the fovea of eye 406, while the peripheral vision of the eye has a significantly lower resolution. Foveal rendering can be used to optimize the required computing power for rendering, where only the region of the virtual image that the user is looking at, for example virtual object 414, is rendered with full detail.

When dynamic lens 408 comprises a pixelated lens, such as those described in the above-mentioned PCT patent application PCT/IB2013/058989, the image quality may be further enhanced by shifting optical center area 412 to line-of-sight 416, as well as by limiting the aperture of optical center area 412. However, limiting the aperture of optical center area 412 may result in a discontinuity at the borders, or in distortions caused by non-constant optical power, wherein these discontinuities and distortions shift dynamically as the optical center area is shifted.

Controller 410 compensates for these discontinuities and distortions by digitally manipulating the image of virtual scene 404, resulting in a smooth viewed image. Unlike standard distortions of lenses, which are already compensated for in typical VR systems, these discontinuities and distortions change dynamically, and therefore the compensation is also implemented dynamically by applying an opposite distortion to the image, in accordance with the configuration of dynamic lens 408, specifically in accordance with the optical power, position and aperture size of optical center area 412.

The distortion can be viewed as position-dependent magnification of the image. The distortion map can be measured directly or approximated similarly to the magnification calculation detailed above—for each position in the image the local magnification is calculated based on the local optical power dynamic lens 408 applies to that position in the image. Light rays that reach pupil 418 from a certain direction, defining a location in the image, pass dynamic lens 408 through a certain region. The optical power implemented in that region defines the local magnification required for that location in the image. The image is scanned and the local magnification is calculated for each location—resulting in a distortion map.

Prismatic Effects

As described above, and with reference to FIG. 10, controller 410 may configure dynamic lens 408 so as to shift optical center area 412 to be centered on line-of-sight 416, connecting pupil 418 of eye 406 and virtual object 414. This kind of lateral shift of optical center area 412 will result in a prismatic effect, wherein shifting the optical center area laterally by a distance x results in a prismatic effect that refracts the light traversing the lens by an angle of x/f (f is the focal length of the optical center area), with a concomitant lateral shift of the image on the retina of eye 406.

Controller 410 compensates for this shift by shifting the image of virtual scene 404 in the opposite direction, so as to cancel the shift of the image on the retina. Controller 410 calculates and implements the required shift based on the focal length f of optical center area 412 and the magnitude of its lateral shift x.

Dispersion and Lateral Color

Chromatic dispersion in dynamic lens 408 and in the optics of projector 402 causes both axial and lateral color (chromatic) aberrations. Axial color aberration, wherein the position of a focal plane of a lens is wavelength dependent, is relatively tolerable to eye 406, as the eye itself has a significant amount of inherent axial color aberration. However, lateral color aberration causes high-contrast off-axis edges to split laterally as a function of wavelength, producing a rainbow-like effect, thus reducing the perceived quality of virtual scene 404.

Controller 410 compensates digitally in virtual scene 404 for lateral color aberration by shifting the red, green and blue images respectively in an opposite but equal amount to the lateral color aberration. The compensation, which is similar to a color-dependent distortion compensation, changes dynamically according to the optical power and the position of optical center area 412.

Fresnel Color Artifacts

Fresnel-lenses, such as dynamic lens 408, are typically optimized for a certain wavelength, and tend to introduce color aberrations when operated at other wavelengths. These aberrations are especially noticeable when the Fresnel-lens is configured to operate with a small phase dynamic range (i.e., generating a small number of wavelengths of phase shift in the incident light).

Controller 410 compensates digitally in virtual scene 404 for the color aberrations of dynamic lens 408. In the embodiments, the point spread function (PSF) of the dynamic lens 408 is characterized as a function of lateral position for the used wavelengths (for instance, red, green and blue). This sort of characterization can be carried out by placing a camera in front of projector 402 and capturing images from the projector through dynamic lens 408. Dynamic lens 408 is configured to a predefined optical power, and the camera is focused such that the displayed image is in sharp focus. The projector sequentially displays red green and blue point source images at various positions on the display, and the camera is used to capture the images and characterize the PSF for red green and blue. Alternatively, the slanted-edge method can be used to characterize the PSF, as is known in the art. Based on the characterized PSF, controller 410 applies an inverse filter to virtual scene 404 before it is displayed. The filter typically amplifies high spatial frequencies.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:
   at least one electro-optical layer, having an effective local index of refraction at any given location within an active area of the electro-optical layer that is determined by a voltage waveform applied across the electro-optical layer at the location;
   conductive electrodes extending over opposing first and second sides of the at least one electro-optical layer; and
   a controller coupled to apply respective control voltage waveforms to the electrodes so as to generate a specified phase modulation profile in the electro-optical layer, the profile comprising a central zone containing a Fresnel-pattern having a parabolic optical phase as a function of a radial coordinate so as to define a Fresnel-lens, surrounded concentrically by one or more annular zones with smoothly-varying optical phase, such that in the one or more annular zones, there are no discontinuities in the optical phase other than phase jumps of $2\pi$ and integer multiples of $2\pi$.

2. The optical device according to claim 1, wherein the one or more annular zones comprise at least first and second annular zones,
   wherein the first annular zone is adjacent to the central zone and is configured to provide a continuous variation of a radial second derivative of the optical phase from the central zone to the second annular zone, and
   wherein the second annular zone surrounds the first annular zone and has a constant radial derivative of the optical phase.

3. The optical device according to claim 2, wherein the one or more annular zones comprise a third annular zone surrounding the second annular zone and having a constant optical phase.

4. A method for operating an optical device, comprising:
   providing at least one electro-optical layer, having an effective local index of refraction at any given location within an active area of the electro-optical layer that is determined by a voltage waveform applied across the electro-optical layer at the location, with conductive electrodes extending over opposing first and second sides of the at least one electro-optical layer; and
   applying respective control voltage waveforms to the electrodes so as to generate a specified phase modulation profile in the electro-optical layer, the profile comprising a central zone containing a Fresnel-pattern having a parabolic optical phase as a function of a radial coordinate defining a Fresnel-lens, surrounded concentrically by one or more annular zones with smoothly-varying optical phase, such that in the one or more annular zones, there are no discontinuities in the optical phase other than phase jumps of $2\pi$ and integer multiples of $2\pi$.

5. The method according to claim 4, wherein the one or more annular zones comprise at least first and second annular zones, wherein generating the first annular zone is adjacent to the central zone and provides a continuous variation of a radial second derivative of the optical phase from the central zone to the second annular zone, and wherein the second annular zone surrounds the first annular zone and has a constant radial derivative of the optical phase.

6. The method according to claim 5, wherein the one or more annular zones comprise a third annular zone surrounding the second annular zone and having a constant optical phase.

7. The optical device according to claim 2, wherein the first annular zone is configured to provide a transition of the optical phase from the parabolic optical phase to a linear optical phase variation.

8. The optical device according to claim 7, wherein the linear optical phase variation extends over all of the second annular zone.

9. The optical device according to claim 1, wherein the conductive electrodes comprise parallel conductive stripes extending across at least the first side of the at least one electro-optical layer.

10. The optical device according to claim 1, wherein the controller is configured to vary the control voltage waveforms applied to the electrodes so as to shift an optical center of the phase modulation profile.

11. The optical device according to claim 10, wherein the controller is configured to shift the optical center of the phase modulation profile to coincide with a line of sight of a viewer observing an object through the electro-optical layer.

12. The method according to claim 5, wherein the first annular zone provides a transition of the optical phase from the parabolic optical phase to a linear optical phase variation.

13. The method according to claim 12, wherein the linear optical phase variation extends over all of the second annular zone.

14. The method according to claim 4, wherein the conductive electrodes comprise parallel conductive stripes extending across at least the first side of the at least one electro-optical layer.

15. The method according to claim 4, wherein applying the respective control voltage waveforms comprises varying the control voltage waveforms applied to the electrodes so as to shift an optical center of the phase modulation profile.

16. The method according to claim 15, wherein varying the control voltage waveforms comprises shifting the optical center of the phase modulation profile to coincide with a line of sight of a viewer observing an object through the electro-optical layer.

* * * * *